(12) United States Patent
Nishimura et al.

(10) Patent No.: US 8,047,535 B2
(45) Date of Patent: Nov. 1, 2011

(54) APPARATUS AND METHOD FOR CONVEYING A SHEET

(75) Inventors: Ritsuo Nishimura, Aichi (JP); Hideki Akita, Aichi (JP)

(73) Assignee: Meinan Machinery Works, Inc., Obu-shi (JP)

( * ) Notice: Subject to any disclaimer, the term of this patent is extended or adjusted under 35 U.S.C. 154(b) by 0 days.

(21) Appl. No.: 12/318,894

(22) Filed: Jan. 12, 2009

(65) Prior Publication Data

US 2009/0121417 A1 May 14, 2009

(30) Foreign Application Priority Data

Jun. 26, 2007 (JP) ................................ 2007-167735

(51) Int. Cl.
*B65H 29/32* (2006.01)
(52) U.S. Cl. .................. 271/197; 271/310; 271/284
(58) Field of Classification Search ................ 271/310, 271/283, 197, 194, 284, 280, 306, 307, 196, 271/202

See application file for complete search history.

(56) References Cited

U.S. PATENT DOCUMENTS

| | | | | |
|---|---|---|---|---|
| 3,123,354 A * | 3/1964 | Ungerer | | 271/197 |
| 4,027,873 A * | 6/1977 | Bishop | | 271/197 |
| 4,681,002 A * | 7/1987 | Nakaya | | 83/76.1 |
| 4,905,843 A * | 3/1990 | Holbert | | 209/571 |
| 5,374,044 A * | 12/1994 | Belec et al. | | 271/2 |
| 5,427,368 A * | 6/1995 | Abe et al. | | 271/283 |
| 6,793,217 B2 * | 9/2004 | Grønbjerg | | 271/197 |
| 6,840,733 B2 * | 1/2005 | Bjorn et al. | | 414/794.4 |
| 2003/0164587 A1 * | 9/2003 | Gronbjerg | | 271/197 |

FOREIGN PATENT DOCUMENTS

DE   1756949 A1   6/1971
DE   10008831 A1   9/2001

OTHER PUBLICATIONS

Partial European Search Report dated Jun. 25, 2009, issued on the corresponding European patent application No. 09150290.6.

* cited by examiner

*Primary Examiner* — Kaitlin Joerger
(74) *Attorney, Agent, or Firm* — Edwards Angell Palmer & Dodge LLP

(57) ABSTRACT

An apparatus and a method for successively conveying a series of sheets are disclosed. The apparatus has a first conveyer for conveying a sheet in a sheet conveying direction at a first speed and a second conveyer disposed spaced vertically away from the first conveyer for conveying the sheet in the same direction at a second speed. The second conveyer has a region overlapping with the first conveyer at least for a distance corresponding to a dimension of the sheet, e.g. the width of veneer sheet, as measured in the sheet conveying direction. A suction mechanism is disposed in said overlapping region for transferring by suction the sheet in the entirety of its dimension from the first conveyer to the second conveyer and holding by suction the sheet against the second conveyer. The sheet is further moved by the second conveyer, e.g. to a sheet stacking station.

24 Claims, 28 Drawing Sheets

APPARATUS AND METHOD FOR CONVEYING A SHEET

BACKGROUND OF THE INVENTION

The present invention relates to a method and an apparatus for conveying a sheet. More specifically, the invention relates to a method for successively conveying a series of sheets, such as veneer sheets, wherein a sheet being conveyed by a first conveyer is transferred to a second conveyer without subjecting the sheet to a tension acting in the sheet conveying direction and also to an apparatus for practicing the method.

In stacking sheets into a pile, it takes a given length of time for one sheet to be stacked completely onto the top of the pile of sheets. In conveying a series of sheets successively and subsequently stacking them one after another uninterruptedly into a pile, any two adjacent sheet being conveyed must be spaced apart for a distance that is long enough to prevent a sheet from arriving at the stacker while its preceding sheet is still in the process of being stacked and from hindering the stacking motion of the preceding sheet. To prevent such trouble, it has been practiced to enlarge the spacing between any two adjacent sheets being conveyed so that the time interval before a sheet arrives at the stacker after its preceding has reached the stacker is longer than the above given length of time that is necessary for a sheet to be stacked completely. Alternatively, a series of sheets being conveyed are divided into two different conveyance paths each having a stacker and every other sheet is transferred to each of the path. In stacking sheets at each of the stackers, a long time is allowed for a sheet comes to the stacker after its preceding sheet has been stacked.

Referring to FIG. 28 showing a known veneer sheet stacking apparatus according to the background art pertaining to the present invention, numeral 100 designates a first conveyer moving at a speed v10 and numeral 101 a second conveyer disposed in alignment with the first conveyer 100 and moving at a speed v11 that is faster than v10. A plurality of veneer sheets 102 are conveyed by the first conveyer 100 with a relatively small spacing between any two adjacent veneer sheets 102. The spacing between the veneer sheets 102 is enlarged by transferring them from the first conveyer 100 to the second conveyer 101 traveling faster than the first conveyer 100.

In such apparatus, however, a veneer sheet 102 just being transferred from the first conveyer 100 to the second conveyer 101 is subjected to a tension caused by the difference in conveying speeds of the first and second lower conveyers 100 and 101. The veneer sheet 102 is stretched apart by the tension acting in the direction perpendicular to the grain of the veneer sheet and it may be broken and rendered unusable.

The apparatus further includes a third conveyer 103 disposed downstream of and spaced above the second conveyer 102 at a distance that is greater than the thickness of the veneer sheet 102 and overlaps with the second conveyer 101. The third conveyer 103 travels at a speed v12 that is faster than v11. The second conveyer 101 has an air blower 104 located in the region overlapping with the third conveyer and operable to blow air constantly upward. Reference numeral 105 designates a stop for stopping a veneer sheet being conveyed by the third conveyer 103 at a given stacking position and reference numeral 106 a stacking stand on which a pile of stacked sheets 102 is supported.

When a veneer sheet 102 being conveyed by the second conveyer 101 enters the overlapping region of the second and third conveyers 101, 103, it is pressed against the third conveyer 103 by air blowing from the blower 104. Then, the veneer sheet 102 is moved at the speed v12 in arrow direction by virtue of the frictional force that the veneer sheet 102 receives from the third conveyer 103. Air is blown no more against the veneer sheet 102 after it has moved past the blower 104. Subsequently, the veneer sheet 102 is dropped while moving further leftward as seen in the drawing, hits against the stop 105 and then is dropped onto the top of the pile of veneer sheets 102.

As shown in FIG. 28, however, a veneer sheet designated by reference symbol 102a and subjected to the air blowing from the blower 104 will firstly have its leading end portion lifted and pressed against the third conveyer 103. Therefore, the pressed portion of the veneer sheet 102a is moved at the speed v12 while the portion of the veneer sheet 102a on the second conveyer 101 is moved at the speed v11, with the result that the veneer sheet 102a is subjected to a harmful tension which may cause the veneer sheet, if it is weak against the tension, to be broken. Furthermore, the veneer sheet 102a has a middle sloped portion which is in contact with neither the second conveyer 101 nor the third conveyer 103 and the weight of this middle portion creates tension against the leading end portion of the veneer sheet 102a which is in contact with the third conveyer 103. As a result, breakage of veneer sheet may occur.

Therefore, an object of the present invention is to provide an apparatus and a method for conveying a sheet which solve the above problems by moving a sheet in its entire dimension as measured in the sheet conveying direction in transferring the sheet from one conveyer to another conveyer.

SUMMARY OF THE INVENTION

The present invention has been made in view of the above drawbacks and, therefore, an object of the present invention is to provide a method and an apparatus for conveying a sheet which solve the problems.

In order to achieve the object, the present invention provides an apparatus for successively conveying a series of sheets which comprises a first conveyer for conveying a sheet in a predetermined sheet conveying direction at a first speed and a second conveyer for conveying the sheet in the same sheet conveying direction at a second speed. The second conveyer is provided, in some preferred embodiments of the invention, above the first conveyer at a distance that is greater than the thickness of the sheet.

The second conveyer has a region overlapping with the first conveyer at least for a distance that corresponds to a dimension of the sheet as measured in the sheet conveying direction. In the embodiments of the present invention, the dimension as measured in the sheet conveying direction corresponds to the width of a veneer sheet that extends across the grain of the veneer. The apparatus further includes a suction mechanism disposed in the overlapping region of the second conveyer for transferring by suction the sheet in the entirety of the above dimension from the first conveyer to the second conveyer and a sheet sensor for detecting the arrival of a sheet in the overlapping region and generating a detection signal indicative of such arrival. A control unit of the apparatus is operable in response to a detection signal from the sensor to activate the suction mechanism for transferring of the sheet and also to deactivate the suction mechanism after an elapse of a predetermined length of time from the activation of the suction mechanism.

Transferring the sheet in the entirety of the its dimension along the sheet conveying direction, the sheet will not be subjected to a tension tending to stretch the sheet in the sheet conveying direction.

In some preferred embodiments of the invention, the second speed of the second conveyer is faster than the first speed of the first conveyer, so that the spacing of any two adjacent sheets being conveyed by the first conveyer is enlarged after they are transferred successively from the first conveyer to the second conveyer.

The apparatus of the present invention may include a stacker disposed downstream of the overlapping region of the second conveyer as viewed in the sheet conveying direction for stacking sheets successively onto a pile of already stacked sheets.

In an embodiment of the present invention, the second speed of the second conveyer is set substantially the same as the first speed of the first conveyer and the first conveyer has an extension conveyer for conveying every other sheet in a direction other than the sheet conveying direction of the first and second conveyers.

The present invention also provides a method of conveying a sheet.

According to the method, a sheet is conveyed in a predetermined sheet conveying direction at a first speed by a first conveyer and the arrival of the sheet at a predetermined position of the first conveyer is detected. Upon detection of the arrival of the sheet, the sheet is transferred by suction of a suction mechanism in the entirety of a dimension of the sheet as measured in the sheet conveying direction from the first conveyer to a second conveyer which is disposed spaced either above or below the first conveyer. The sheet thus transferred is held by suction of the suction mechanism against the second conveyer. As in the case of the sheet conveying apparatus of the present invention, the second conveyer has a region overlapping with the first conveyer at least for a distance that corresponds to the above dimension of the sheet and the suction mechanism is disposed in the overlapping region of the second conveyer. The sheet thus transferred to the second conveyer is conveyed in the same sheet conveying direction at a second speed by the second conveyer.

According to some preferred embodiment, the second speed of the second conveyer is faster than the first speed of the first conveyer and the sheet is released by a releasing mechanism from the second conveyer at a predetermined releasing position by a releasing mechanism. The sheet thus released from the second conveyer is stacked onto a pile of sheets. In such a case, the releasing operation of the releasing mechanism is completed before a next sheet following the above sheet reaches the releasing position.

Features and advantages of the present invention will become more apparent to those skilled in the art from the following description of preferred embodiments of the present invention, which description is made with reference to the accompanying drawings, wherein:

DETAILED DESCRIPTION OF EMBODIMENTS

The following will describe the first embodiment of the present invention with reference to FIGS. 1 through 7.

The feature of the first embodiment resides in permitting a veneer sheet being conveyed in a predetermined sheet conveying direction by a first conveyer to be lifted or transferred to a moving second conveyer without subjecting the veneer sheet to a tension acting in the sheet conveying direction and also making it possible to enlarge the spacing between any two adjacent veneer sheets in the conveying direction by moving the first and second conveyers at different conveying speeds.

Figure 1:
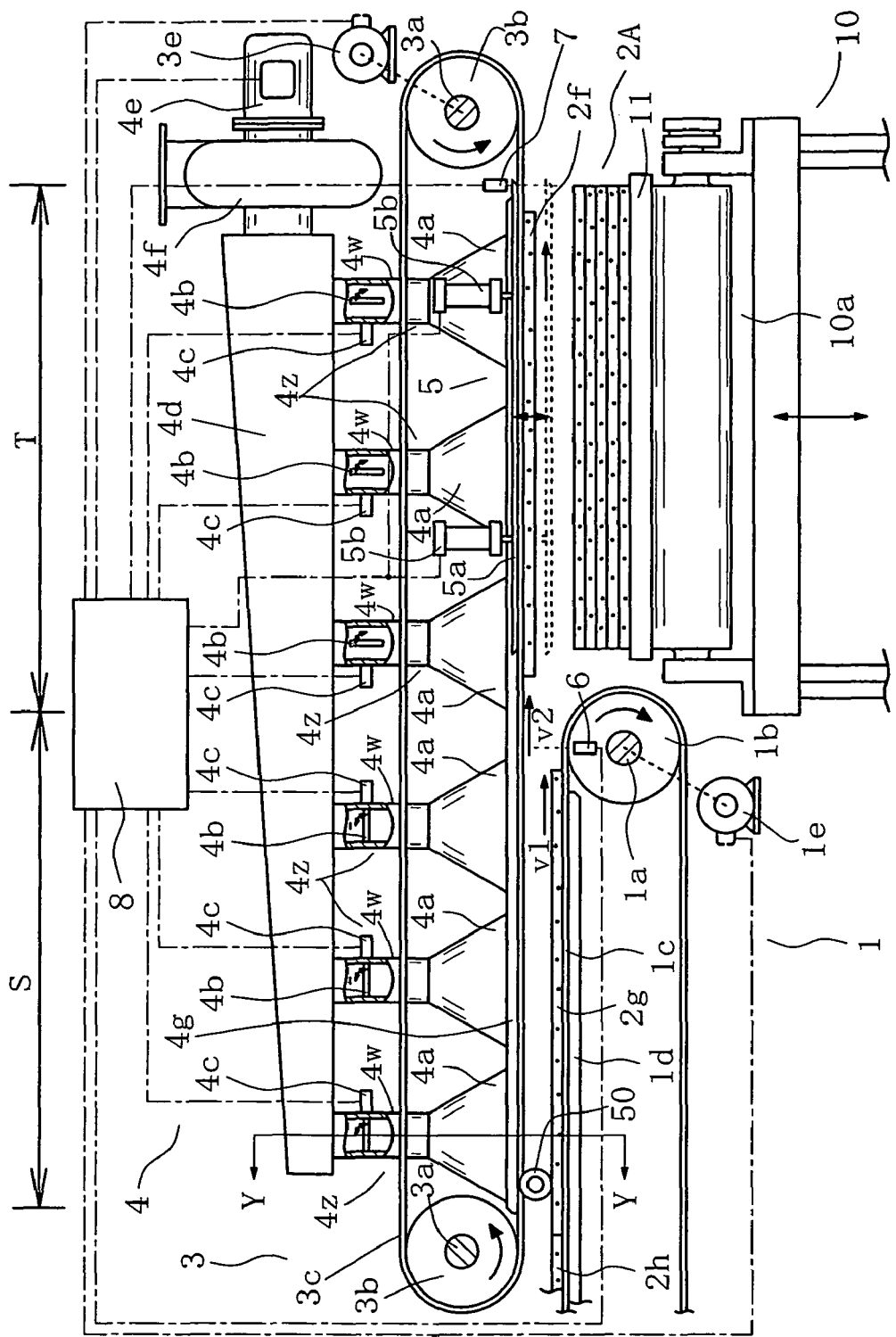
FIG. 1 is a side view showing a first embodiment of a sheet conveying apparatus according to the present invention.
Figure 2:
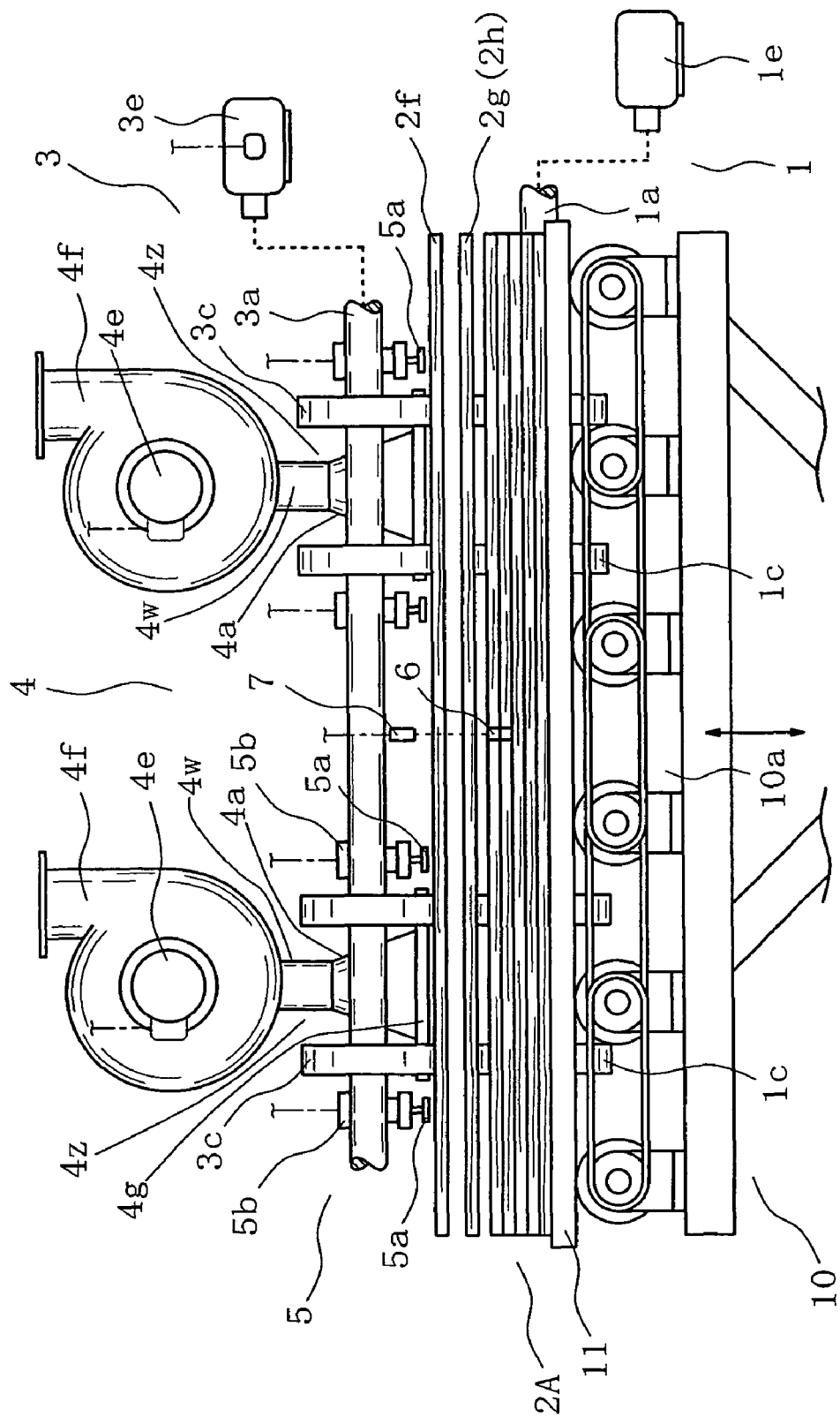
FIG. 2 is a rear view of the sheet conveying apparatus of FIG. 1 as viewed from the right-hand side of FIG. 1.

Referring to the drawings, reference numeral 1 designates generally a first conveyer for conveying a series of veneer sheets 2g, 2h and so forth at a speed v1 in the arrow sheet conveying direction. Referring to FIGS. 1 and 2, the first conveyer 1 include a pair of spaced rotary shafts 1a (only one shaft being shown) spaced in the sheet conveying direction and an electric motor 1e for constantly driving one of rotary shafts 1a in arrow direction. The first conveyer 1 further includes two pairs of conveyer belts 1c. The conveyer belts 1c of each pair are spaced in the direction perpendicular to the sheet conveying direction, wound between two pulleys 1b fixedly mounted on the rotary shafts 3a and traveling at the speed v1. The two pairs of conveyer belts 3c are spaced in the direction perpendicular to the sheet conveying direction. A belt support 1d is disposed immediately below the upper leg of the conveyer belts 1c. As indicated by a chain line, the electric motor 1e is operatively connected to a control unit 8 of the veneer sheet conveying apparatus.

Reference numeral 3 designates generally a second conveyer located above and parallel to the first conveyer 1. Specifically, as shown in FIG. 1, the second conveyer 3 is spaced above the first conveyer 1 at a spaced distance that is greater than the thickness of the veneer sheet, e.g. 2g, and overlaps on the upstream side thereof as viewed in the sheet conveying direction with the first conveyer 1 at least for a distance corresponding to the dimension of the veneer sheet as measured in the sheet conveying direction. For the sake of description, the region of the second conveyer 3 where it overlaps with the first conveyer 1 will be referred to as S region and the rest of the second conveyer 3 as T region, respectively, as indicated by double-headed arrows at the top of FIG. 1.

Referring specifically to FIGS. 1 and 2, the second conveyer 3 includes a pair of rotary shafts 3a spaced in the sheet conveying direction and an electric motor 3e for driving constantly one of the rotary shafts 3a located on the downstream side or the right-hand side as seen in FIG. 1. As best seen in FIG. 2, the second conveyer 3 further includes two pairs of conveyer belts 3c. The conveyer belts 3c of each pair, e.g. two conveyer belts 3c on the left side as seen in FIG. 2, are spaced in the direction perpendicular to the sheet conveying direction, wound between two pulleys 3b fixedly mounted on the rotary shafts 3a and traveling at a speed v2 that is faster than the speed v1. The two pairs of conveyer belts 3c are spaced in the direction perpendicular to the sheet conveying direction. As indicated by a chain line, the electric motor 3e is operatively connected to the control unit 8.

Figure 3:
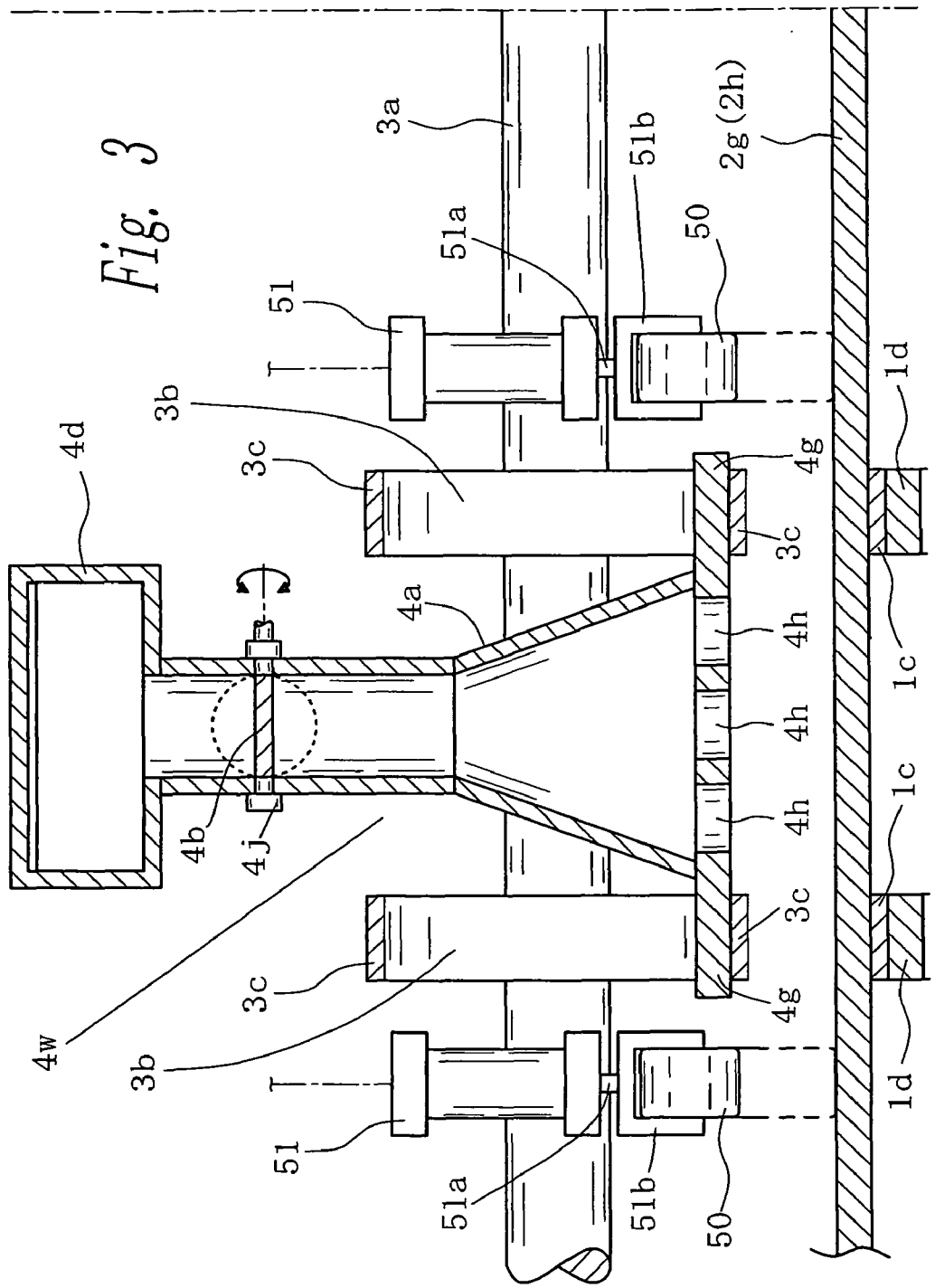
FIG. 3 is a partially sectional fragmentary view taken along and seen from line Y-Y of FIG. 1.

Referring to FIGS. 1, 2 and 3, reference numeral 4 designates generally a suction mechanism for the second conveyer 3 including a pair of vacuum devices 4f of multi-blade fan type, an electric motor 4e connected to and driving each of the vacuum devices 4f, a closed duct 4d connected also to each of the vacuum devices 4f. Each duct 4d is disposed horizontally above the second conveyer 3 and tapered so that the inner space of the duct is reduced toward the upstream end of the second conveyer 3 with respect to the sheet conveying direction. The suction mechanism 4 further includes three suction members 4z provided for each of the S and T regions of the second conveyer 3. The suction members 4z are arranged equidistantly along the sheet conveying direction in each of the S and T regions of the second conveyer 3 and connected to the bottom of the duct 4d. Each suction member 4z has a cylindrical connection tube 4w connected to the duct 4d and a suction nozzle 4a connected to the bottom of the connection tube 4w and expanding downward. As indicated by a chain line, the electric motor 4e is operatively connected to a control unit 8.

As shown in FIG. 3, the bottom of the suction nozzle 4a is perforated or formed with a plurality of suction holes 4h through which air is drawn into the suction nozzle 4a, as will be explained more in detail in later part hereof, and has at the opposite sides thereof guide projections 4g extending outward as seen in FIG. 3, i.e. in the direction perpendicular to the sheet conveying direction.

Referring to FIGS. 1 and 3, a disk-shaped valve 4b is fixedly mounted on a rotatable shaft 4j in each cylindrical connection tube 4w of the suction member 4z. The valve 4b is operable by an air cylinder 4c so as to open or close the air passage through the cylindrical connection tube 4w thereby to activate or deactivate suction vacuum at the suction nozzle 4a. As indicated by chain lines in FIG. 1, each air cylinder 4c is operatively connected to the control unit 8. As shown in FIG. 3, the guide projections 4g of the suction members 4z are formed and arranged so as to guide the upper legs of the conveyer belts 3c of the second conveyer 3 in contact with the upper surface thereof.

The vacuum device 4f has a capacity to create suction vacuum in the closed duct 4d that is strong enough to lift a veneer sheet from the first conveyer 1 and hold the veneer sheet against the lower leg of the conveyer belts 3c of the second conveyer 3 by suction developed in the suction nozzle 4a. Three suction members 4z in each of the S and T regions of the second conveyer 3 are arranged so as to cover at least a distance that substantially corresponds to the dimension of a veneer sheet as measured in the sheet conveying direction. That is, the suction members 4z in each of the S and T regions are arranged so as to activate suction at least over the above distance.

Referring to FIGS. 1 and 2 again, reference numeral 5 designates a sheet releasing mechanism provided in the T region of the second conveyer 3. The sheet releasing mechanism 5 includes a pair of elongated releasing plates 5a for each pair of conveyer belts 3c of the second conveyer 3. The releasing plates 5a of each pair are spaced away from each other in the direction perpendicular to the sheet conveying direction and extend in the sheet conveying direction. The sheet releasing mechanism 5 further includes an air cylinder 5b for each releasing plate 5a for vertically reciprocally moving the releasing plate 5a. The air cylinders 5b are connected to the control unit 8 and actuable to move the releasing plates 5a reciprocally for the releasing operation of the releasing mechanism 5. Specifically, the releasing plates 5a are firstly moved downward to push a veneer sheet in the T region, e.g. 2f indicated by solid line in FIGS. 1 and 2, to a position that is close to a veneer sheet at the top of a pile of veneer sheets 2A stacked on a stacking plate 11 of a veneer sheet stacker of the apparatus, which will be described in detail later, and then moved upward back to their original elevated position of FIG. 1. As will be described later, the air cylinders 5b are actuated for sheet releasing operation each time a veneer sheet being conveyed is located at a releasing position immediately above a veneer sheet stacking stand 10 of the stacker so that the veneer sheet is released rapidly from the second conveyer 3 and stacked onto the pile of veneer sheets 2A on the stacking plate 11.

Reference numeral 6 in FIGS. 1 and 2 designates a first sheet sensor such as photo cell provided at a position adjacent to the downstream end of the first conveyer 1 and between the two pairs of pulleys 3b and operatively connected to the control unit 8 as indicated by chain line in the drawings for detecting the leading end of an incoming veneer sheet, such as 2g, and generating a detection signal to the control unit 8. That is, the first sheet sensor 6 is disposed such that the leading end of the veneer sheet is detected by the sensor 6 when the full sheet of veneer has arrived in the S region of the second conveyer 3.

Reference numeral 7 designates a second sheet sensor of the same type as the first sensor 6, which is provided at an appropriate position adjacent to the downstream end of the second conveyer 3 for detecting the leading end of an incoming veneer sheet, such as 2f, conveyed by the second conveyer 3 and generating a detection signal to the control unit 8. The second sheet sensor 7 is disposed such that the leading end of veneer sheet is detected by the second sensor 7 when the veneer sheet has reached the veneer sheet releasing position immediately above the stacking stand 10.

Referring to FIGS. 1 and 3, reference numeral 50 designates a pair of rollers, each freely rotatably supported by a holder 51b mounted to the lower end of a piston rod 51a of an air cylinder 51 which is fixedly mounted to a frame (not shown) of the apparatus. The roller 50 is reciprocally movable by the air cylinder 51 between the lowered position with the piston rod 51a fully extended out of the air cylinder 51, as indicated by solid line in FIG. 1 and dotted line in FIG. 3 and the elevated position with the piston rod 51a retracted in the air cylinder 51, as indicated by solid line in FIG. 3. The roller 50 in its lowered position is in contact with the upper surface of a veneer sheet being conveyed by the first conveyer 1 for holding the veneer sheet against the first conveyer 1, as shown in FIGS. 1 and also 5. On the other hand, the roller 50 in its elevated position is spaced away from a veneer sheet which is then held by suction against the lower leg of the conveyer belts 3c of the second conveyer 3, as shown in FIGS. 3 and also 4.

Referring to FIGS. 1 and 2, the aforementioned veneer stacking stand of the stacker designated generally by numeral 10 is provided below the T region of the second conveyer 3 substantially corresponding to the aforementioned veneer sheet releasing position and veneer sheets conveyed by the second conveyer 3 to this position are released successively from the second conveyer 3 and stacked one on another into a pile of veneer sheets on this stacking stand 10. The veneer sheet stacking stand 10 has a delivery conveyer 10a. The aforementioned stacking plate 11 is placed on the delivery conveyer 10a for supporting thereon a pile of veneer sheets 2A. The veneer stacking stand 10 is operable to move vertically as indicated by double-headed arrow in FIG. 1 so that the veneer sheet located at the top of the pile 2A on the plate 11 is kept at a predetermined level during the veneer sheet stacking operation. Controlling of such movement of the stacking stand 10 may be accomplished by any suitable control system known in the art.

The control unit 8 has incorporated therein a delay circuit and is operable to receive various signals from various devices and to control the operation of the sheet conveying apparatus as will be described in the following.

The following will describe the operation of the above-described veneer sheet conveying apparatus according to the first embodiment with reference to FIGS. 1 and 4 through 7. The description of the operation will begin from the state of the apparatus as indicated by solid line shown in FIG. 1, wherein a plurality of veneer sheets, such as 2h, 2g and so forth, are being moved by the first conveyer 1 and a veneer sheet 2f held by suction and being conveyed by the second conveyer 3 by virtue of the friction acting on the veneer sheet 2f from the conveyer belts 3c is just about to reach the releasing position.

In the case of the present embodiment, as well as the other embodiments which will be explained hereinafter, all veneer sheets such as 2h, 2g, 2h and so forth have substantially the same length, width and thickness and each veneer sheet is conveyed in such an orientation that its length along the wood grain of the veneer sheets extend perpendicularly to the veneer sheet conveying direction and, therefore, each veneer sheet is conveyed with its width moved along the sheet conveying direction. That is, the lateral extension of a veneer sheet as seen, e.g. in FIG. 1 corresponds to its width and the lateral extension of a veneer sheet as seen, e.g. in FIG. 2 correspond to its length.

For the sake of description, the following will deal with only full veneer sheets each having predetermined length and width. It is noted, however, that the present invention is also applicable to such a case wherein a plurality veneer strips having widths that are short of the predetermined width, but the sum of such short widths makes the full width, is dealt with as a full sheet.

In the state in FIG. 1, the valves 4b in the cylindrical connection tubes 4w of three suction members 4z for the T region of the second conveyer 3 are opened, so that a veneer sheet 2f is held by suction against the lower leg of the conveyer belts 3c of the second conveyer 3. By virtue of the friction between the veneer sheet 2f and the conveyer belts 3c, the veneer sheet 2f thus held against the conveyer belts 3c is moved by the conveyer 3. On the other hand, the valves 4b of three suction members 4z for the S region of the second conveyer 3 are closed, so that a veneer sheet 2g is being moved by the first conveyer 1. As shown in FIG. 1, a plurality of veneer sheets 2g, 2h and so forth are being conveyed by the first conveyer 1 with very little spacing between any two adjacent veneer sheets.

Figure 4:
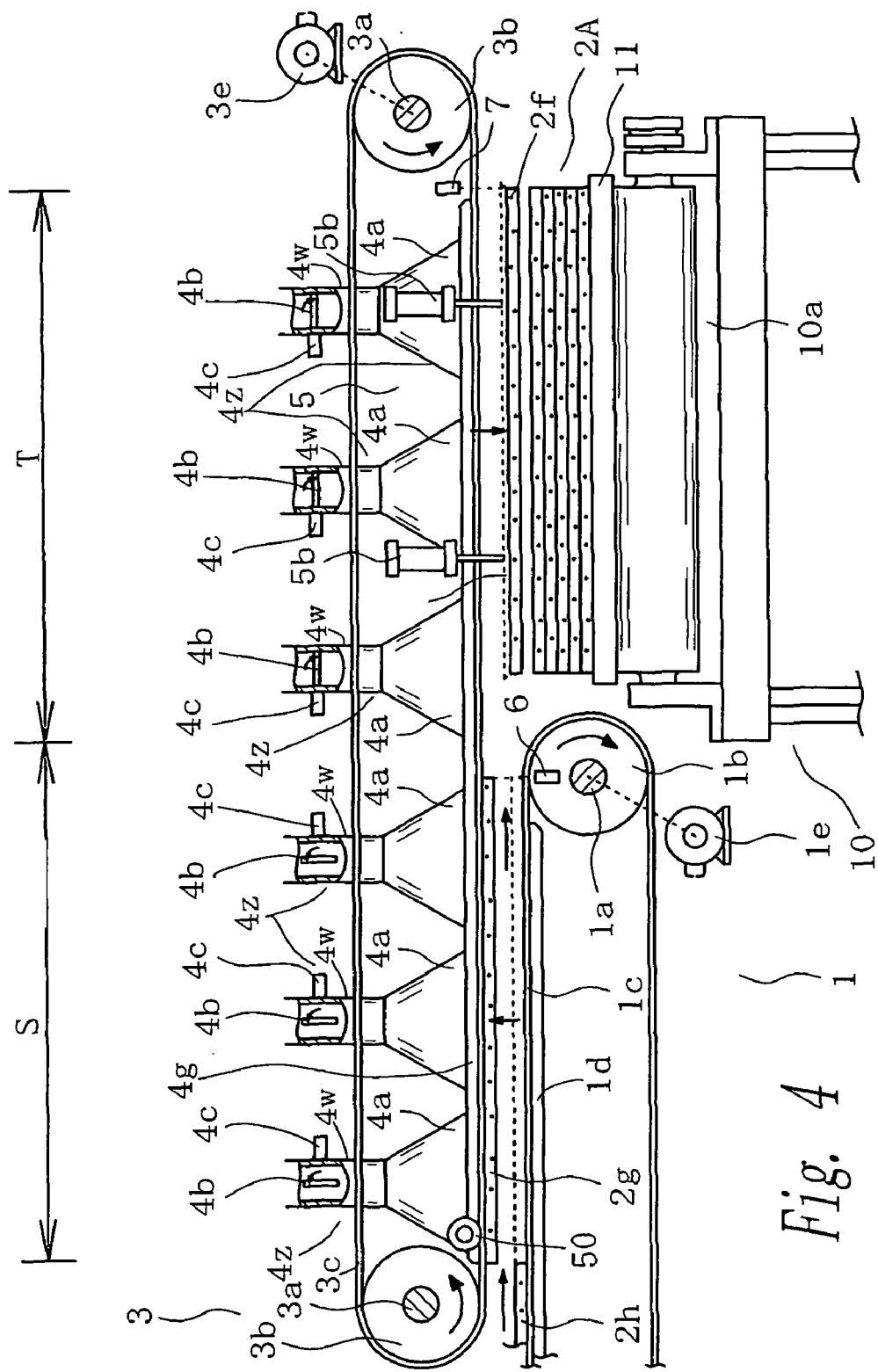
FIGS. 4 through 7 are illustrative views showing different steps of operation of the sheet conveying apparatus of FIG. 1.

When the veneer sheet 2f is moved further by the second conveyer 3 to reach the releasing position immediately above the stacking stand 10 of the stacker, the leading end of the veneer sheet 2f is detected by the second sheet sensor 7, which then generates a detection signal to the control unit 8. The control unit 8 receiving such detection signal from the second sensor 7 actuates simultaneously the air cylinders 4c of the suction members 4z for the T region of the second conveyer 3 so as to close their corresponding valves 4b simultaneously thereby to deactivate suction at the suction nozzle 4a. Simultaneously, the control unit 8 also actuates the air cylinders 5b so as to reciprocate the releasing plates 5a of the sheet releasing mechanism 5. As a result, the veneer sheet 2f is released from the conveyer belts 3c of the second conveyer 3, as shown in FIG. 4, and dropped onto the top of the pile of veneer sheets 2A.

In the meantime, the veneer sheet 2g following the veneer sheet 2f is conveyed at the speed v1 by the first conveyer 1 toward the S region of the second conveyer 3, as shown in FIG. 1. When the leading end of the veneer sheet 2g is detected by the first sheet sensor 6, the control unit 8 receiving a detection signal from the first sensor 6 actuates simultaneously the air cylinders 4c of the suction members 4z for the S region of the second conveyer 3 so as to open their valves 4b simultaneously, thereby activating suction at the suction nozzle 4a for the S region. Simultaneously, the control unit 8 actuates the air cylinders 51 so as to retract their piston rods 51a into the cylinders 51 thereby to shift the rollers 50 to their elevated position. As a result, the veneer sheet 2g is lifted or transferred from the first conveyer 1 to the second conveyer 3 and held by suction against the lower legs of the conveyer belts 3c of the second conveyer 3 by suction developed in the suction nozzles 4a of the suction members 4a for the S region of the second conveyer 3, as shown by solid line in FIG. 4. In this transferring, the suction of the suction nozzles 4a of three suction members 4z for the S region acts substantially on the entire width of the veneer sheet 2g, the lifting is accomplished for the entire width of the veneer sheet 2g.

The veneer sheet 2g thus transferred from the first conveyer 1 is further moved in the sheet conveying direction by the second conveyer 3 then at the speed v2 that is faster than v1. Accordingly, the veneer sheet 2g is accelerated by receiving frictional force from the second conveyer 3 acting in the sheet conveying direction. When the veneer sheet 2g is accelerated, frictional force of the second conveyer 3 acts on the entire veneer sheet 2g, so that the veneer sheet 2g is subjected to no tension acting in the sheet conveying direction, with the result that the veneer sheet 2g is conveyed forward safely without being broken.

Receiving the above detection signal from the first sensor 6, the control unit 8 performs various controlling operations. In response to the detection signal, the control unit 8 generates a series of command signals through its incorporated delay circuit to actuate the air cylinders 4c of the suction members 4z for the S region of the second conveyer 3. Specifically, the command signals are generated successively with such delays that the air cylinders 4c for the S region are successively actuated so as to close their valves 4b thereby to deactivate suction at each of the suction nozzles 4a just after the trailing end of the veneer sheet 2g has moved past each of such suction nozzle 4a. Such operation of the valves 4b in synchronism with the movement of a veneer sheet is performed to ensure stability in conveying of veneer sheet by the second conveyer 3. That is, if the valve 4b at any suction member 4z kept open even after the trailing end of the veneer sheet has moved past its corresponding suction nozzle 4a, a large amount of air is drawn through the suction holes 4h into the suction members 4z and, therefore, suction vacuum in the duct 4d is decreased significantly. This lowers the suction at the suction nozzles 4a under which the veneer sheet is held against the belt conveyers 3c, with the result that the veneer sheet may fail to be conveyed properly or be dropped off from the second conveyer 3.

Figure 5:
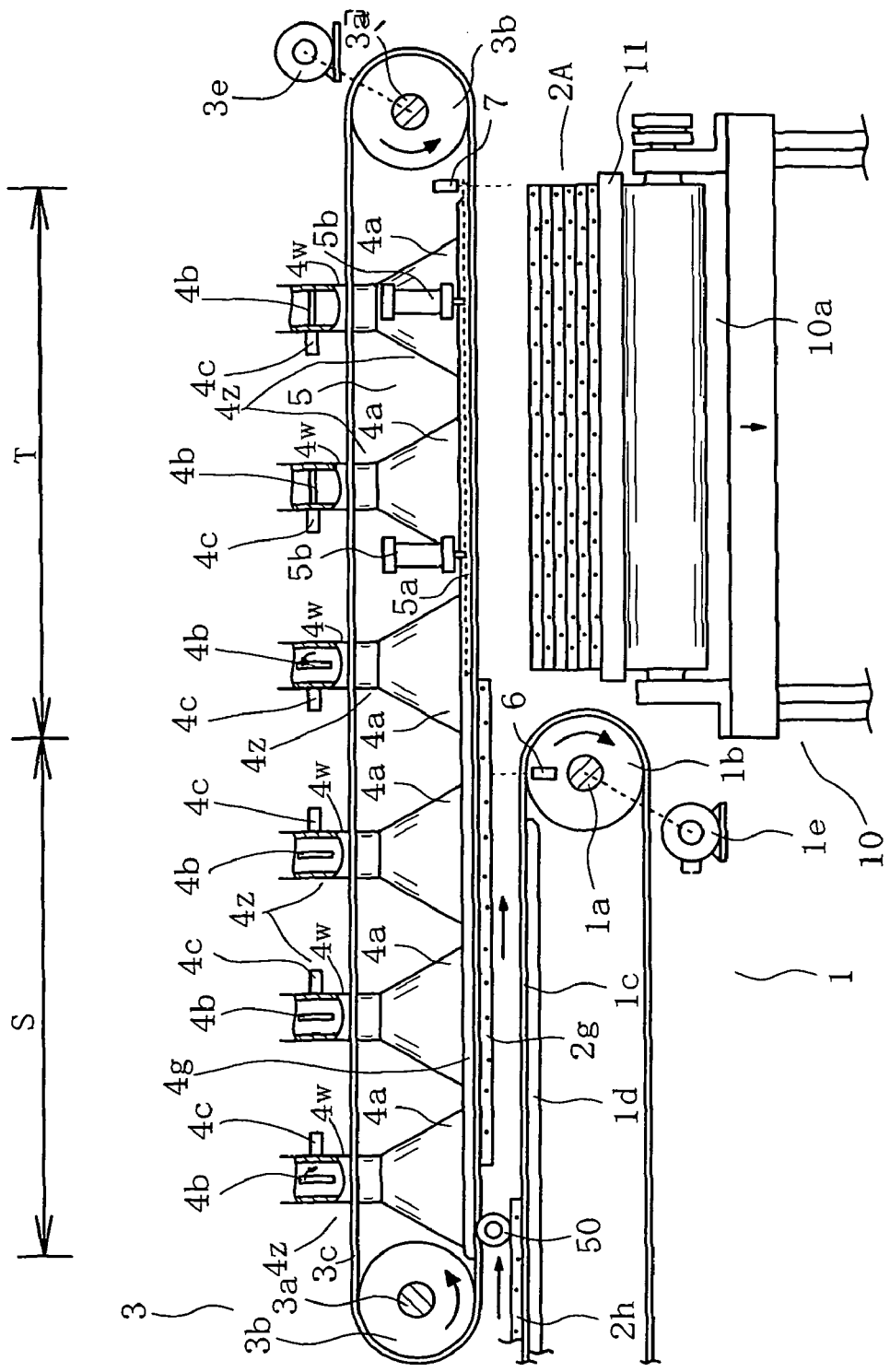

In response to the above detection signal from the first sensor 6, the control unit 8 also generates a command signal with such a delay that the air cylinders 51 are actuated so as to move the rollers 50 to their lowered position into contact with the upper surface of the subsequent veneer sheet 2h for holding it against the first conveyer 1, as shown in FIG. 5, after the trailing end of its preceding veneer sheet 2g has moved past the rollers 50 and also the leading end of the veneer sheet 2h has reached below the rollers 50. By so controlling, the veneer sheet 2h being conveyed by the first conveyer 1 is prevented from being lifted by suction then acting in the suction nozzle 4a provided at the upstream end of the S region of the second conveyer 3, i.e. the leftmost suction nozzle 4a as seen, e.g. in FIG. 5.

Figure 6:
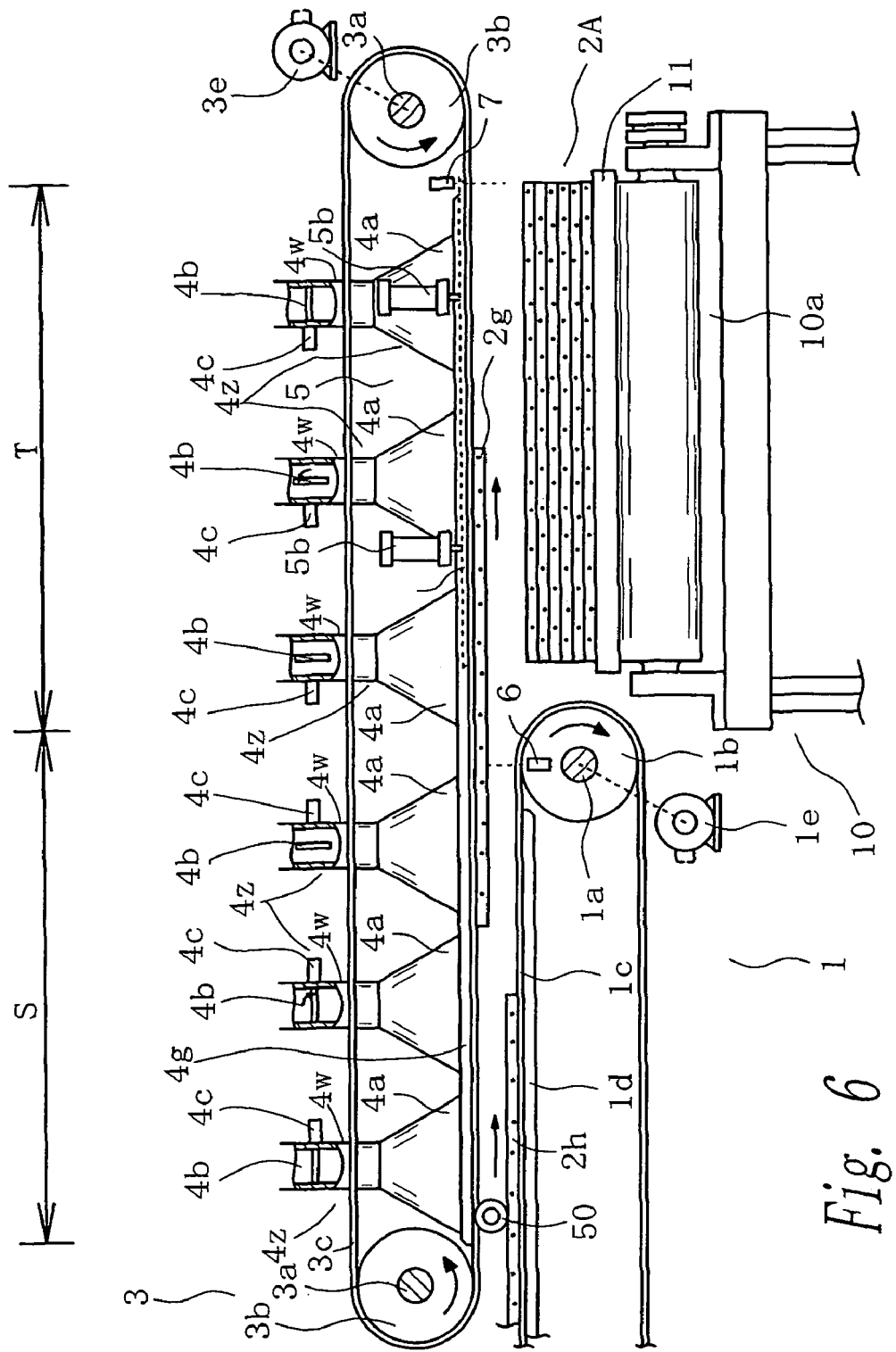

Furthermore, the control unit 8 receiving the above detection signal from the first sensor 6 generates a series of command signals successively through its incorporated delay circuit to actuate the air cylinders 4c of the suction members 4z for the T region of the second conveyer 3 with such delays that the air cylinders 4c for the T region are successively actuated to so as to open their valves 4b thereby to activate suction at each of the suction nozzles 4a just before the leading end of the veneer sheet 2g reaches each of such suction nozzle 4a, as appreciated from FIGS. 5 and 6. Such operation of the valves 4b for the T region of the second conveyer 3 in synchronism with the movement of a veneer sheet is performed for the same purpose of ensuring stability in conveying a veneer sheet by the second conveyer 3.

Figure 7:
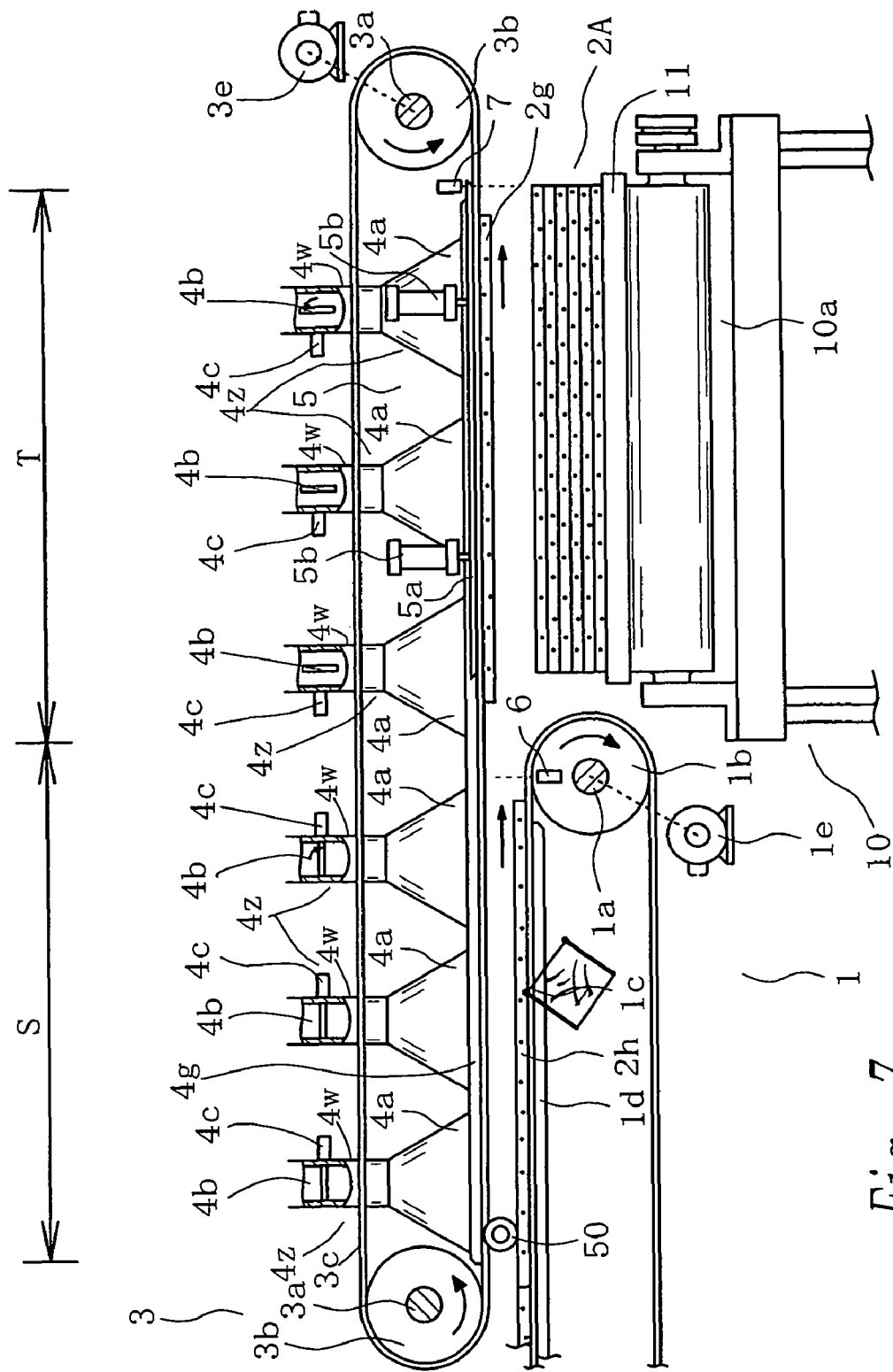

Thus, the veneer sheet 2g is moved by the second conveyer 3 toward the releasing position immediately above the veneer sheet stacking stand 10, as shown in FIGS. 5 through 7. When the leading end of the moving veneer sheet 2g is detected by the second sensor 7, the air cylinders 5b are actuated to activate the releasing plates 5a of the sheet releasing mechanism 5 for separating the veneer sheet 2g from the conveyer belts 3c of the second conveyer 3 and allowing the sheet 2g to be dropped onto the top of the pile of veneer sheets 2A in the same manner as in the case with the preceding veneer sheet 2f.

A veneer sheet 2h following the veneer sheet 2g and conveyed by the first conveyer 1 is lifted and transferred to the second conveyer 3 in the same manner as in the case of its preceding veneer sheet 2g when the leading end is detected by the first sheet sensor 6, and conveyer further at the speed v2 by the second conveyer 3 in the same manner as described above with the case of the veneer sheet 2g.

For accomplishing smooth and uninterrupted stacking of veneer sheets at the stacking station, the conveying speeds v1 and v2 of the first and second conveyers 1 and 3 and the time required for the releasing plates 5a to make a complete reciprocating operation are so established that releasing of the veneer sheet 2g from the second conveyer 3 is completed before the next veneer sheet 2h reaches the releasing position. The spaced distance between any two adjacent veneer sheets, e.g. veneer sheets 2g and 2h, on the second conveyer 3 can be figured out by multiplying the difference between v2 and v1 by the length of time from the moment when the veneer sheet 2g begins to be conveyed by the second conveyer 3 until the next veneer sheet 2h begins to be conveyed by the second conveyer 3.

The above-described steps of operation are repeated to convey and stack a series of veneer sheets successively.

According to the embodiment, veneer sheets being conveyed by the first conveyer 1 with very little spacing between any two adjacent veneer sheets can be stacked uninterruptedly by transferring them to the second conveyer 3 running faster than the first conveyer 1. As obvious from the foregoing, a veneer sheet being moved by the first conveyer 1 is lifted or transferred by suction in its entirety along the width thereof extending in the sheet conveying direction. That is, a veneer sheet being moved by the first conveyer 1 at the speed v1 receives in its entire width the frictional force from the second conveyer 3. Thus, according to the present embodiment, the veneer sheet is subjected to no damaging tension acting in the sheet conveying direction and the spacing between any two adjacent veneer sheets can be enlarged without braking the veneer sheets.

The following will describe the second embodiment of the present invention with reference to FIGS. 8 through 13. In the following description, those parts or elements which are similar to the counterparts of the first embodiment will de designated by like numerals or symbols and the details description of such parts and elements will be omitted. The feature of the second embodiment is substantially the same as that of the first embodiment.

The sheet conveying apparatus of the second embodiment has substantially the same first conveyer 1 having the conveyer belts 1c traveling at the speed v1 as the first conveyer of the first embodiment. The second embodiment differs from the first embodiment in that the second conveyer 3 of the first embodiment having pairs of conveyer belts 3c each extending over the S and T regions is substituted by a second conveyer 9 having separate conveyer belts 9c and 9h for the S and T regions, respectively, and also that the sheet releasing mechanism 5 of the first embodiment is dispensed with.

Figure 8:
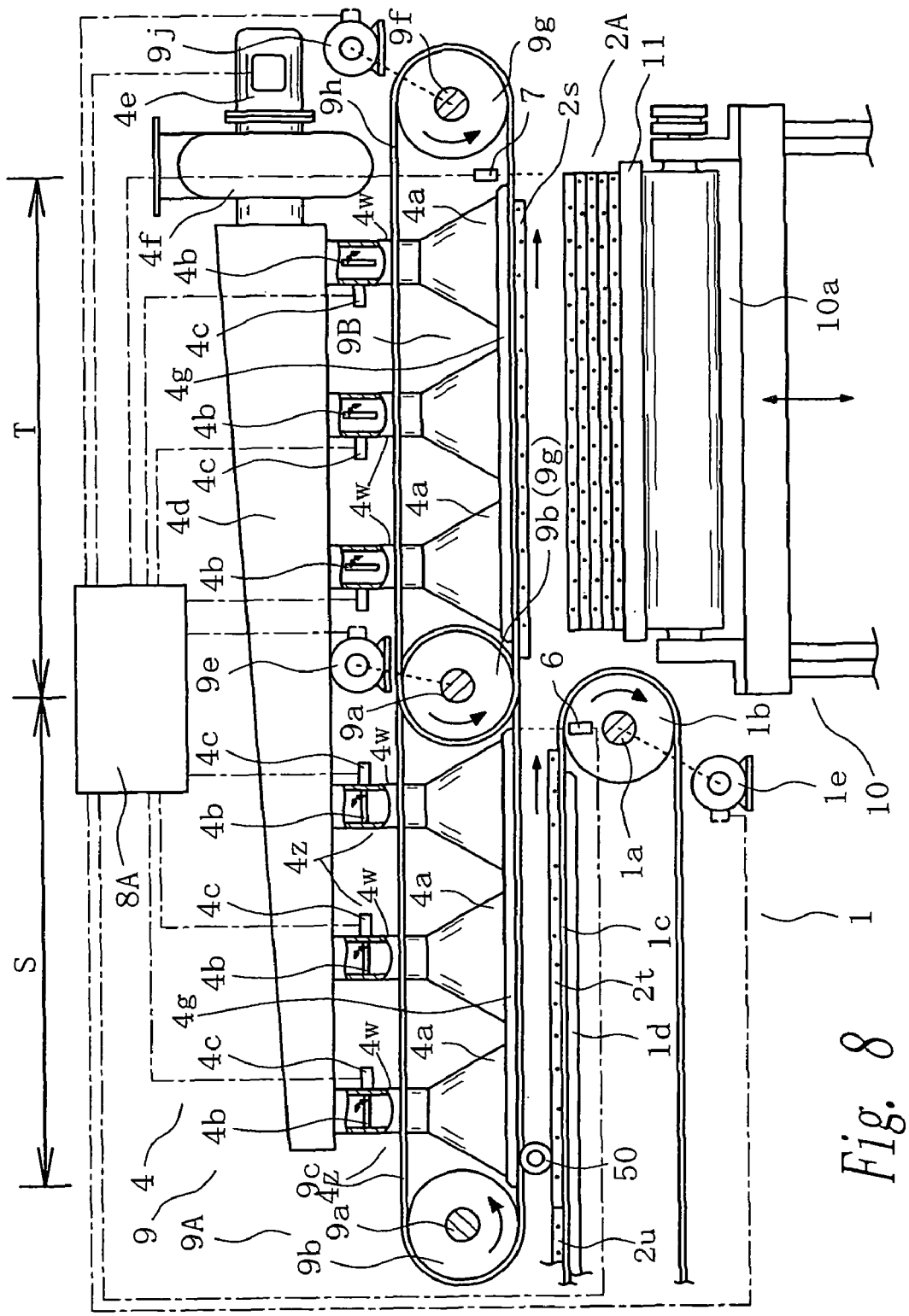
FIG. 8 is a side view showing a second embodiment of a sheet conveying apparatus according to the present invention.

Referring to FIG. 8, the second conveyer 9 includes an upstream conveyer 9A and a downstream conveyer 9B connected together in series in the sheet conveying direction. The upstream conveyer 9A has a pair of spaced rotary shafts 9a, pulleys 9b mounted on the rotary shafts 9a, two pairs of conveyer belts 9c installed between two pulleys 9b and an electric motor 9e for driving constantly the rotary shaft 9a located on the right-hand side as seen in FIG. 1. The upstream conveyer 9A is disposed spaced above the first conveyer 1 at a distance that is greater than the thickness of the veneer sheet, overlapping with the first conveyer 1 at least for a distance corresponding to the widthwise dimension of a veneer sheet, e.g. 2t (FIG. 8) as measured in the sheet conveying direction and spaced upward from. The range of the upstream conveyer 9A which overlaps with the first conveyer 1 for the above distance forms the S region, as indicated by double-headed arrow at the top of FIG. 1. The upstream conveyer 9A of the second conveyer 9 is driven to travel constantly at the speed v2 that is faster than the speed v1 of the first conveyer 1.

Figure 9:
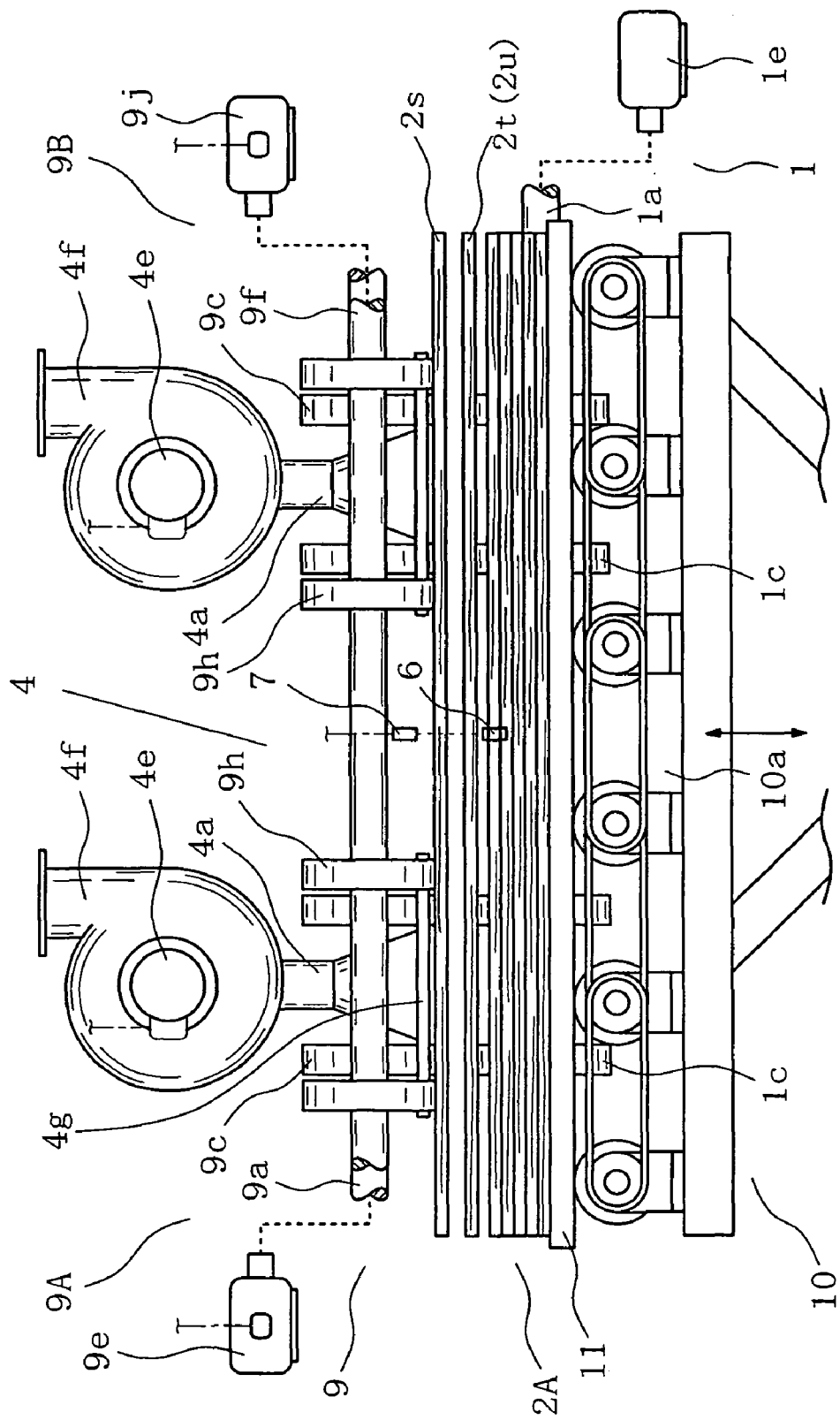
FIG. 9 is a rear view of the sheet conveying apparatus of FIG. 8 as viewed from the right-hand side of FIG. 8.

Referring to FIGS. 8 and 9, the downstream conveyer 9B has a rotary shaft 9f, pulleys 9g fixedly mounted on the rotary shafts 9a, 9f, two pairs of conveyer belts 9h installed between the pulleys 9g and an electric motor 9j operable to drive and stop the rotary shaft 9f as required. The downstream conveyer 9B forms the T region of the second conveyer 9. The stacking stand 10 of the stacker is located below the downstream conveyer 9B.

Unlike the electric motor 9e, the electric motor 9j for the downstream conveyer 9B is operable to be activated or deactivated (or stopped) as required in response to a command signal from the control unit 8A, so that the conveyer belts 9h of the downstream conveyer 9B is operated accordingly. To permit such operation of the downstream conveyer 9B, the downstream pulley 9g of the paired pulleys 9g is freely rotatably mounted on the rotary shaft 9a.

The suction mechanism 4 and its relates parts and devices are constructed and arranged substantially in the same manner as the counterparts of the first embodiment. The same is true of the paired rollers 50 and the control unit 8A. The first and second sheet sensors 6 and 7 are located at appropriate positions adjacent to the downstream ends of the first conveyer 1 and the downstream conveyer 9B of the second conveyer 9, respectively.

The following will describe the operation of the veneer sheet conveying apparatus of the second embodiment. The description of the operation will begin from the state of the apparatus shown in FIG. 8, wherein the valves 4b of three suction members 4z for the T region are all opened and a veneer sheet 2s is held by suction against and being moved by the conveyer belts 9h of the downstream conveyer 9B. The valves 4b of three suction members 4z for the S region are all closed. As in the case of the first embodiment, a plurality of veneer sheets such as 2t and 2u are being moved the first conveyer 1.

When the veneer sheet 2s is moved further by the downstream conveyer 9B of the second conveyer 9 to reach the releasing position immediately above the stacking stand 10, the leading end of the veneer sheet 2f is detected by the second sheet sensor 7, which then generates a detection signal to the control unit 8A. The control unit 8A receiving such detection signal deactivates the electric motor 9j thereby to stop the downstream conveyer 9B and then actuates the air cylinders 4c of the suction members 4z for the T region of the second conveyer 9, so that their corresponding valves 4b are closed simultaneously for deactivating the suction at the suction nozzles 4a of these suction members 4z. As a result, the veneer sheet 2s is released and dropped by its own weight from the conveyer belts 9h onto the top of the veneer sheet pile 2A.

Figure 10:
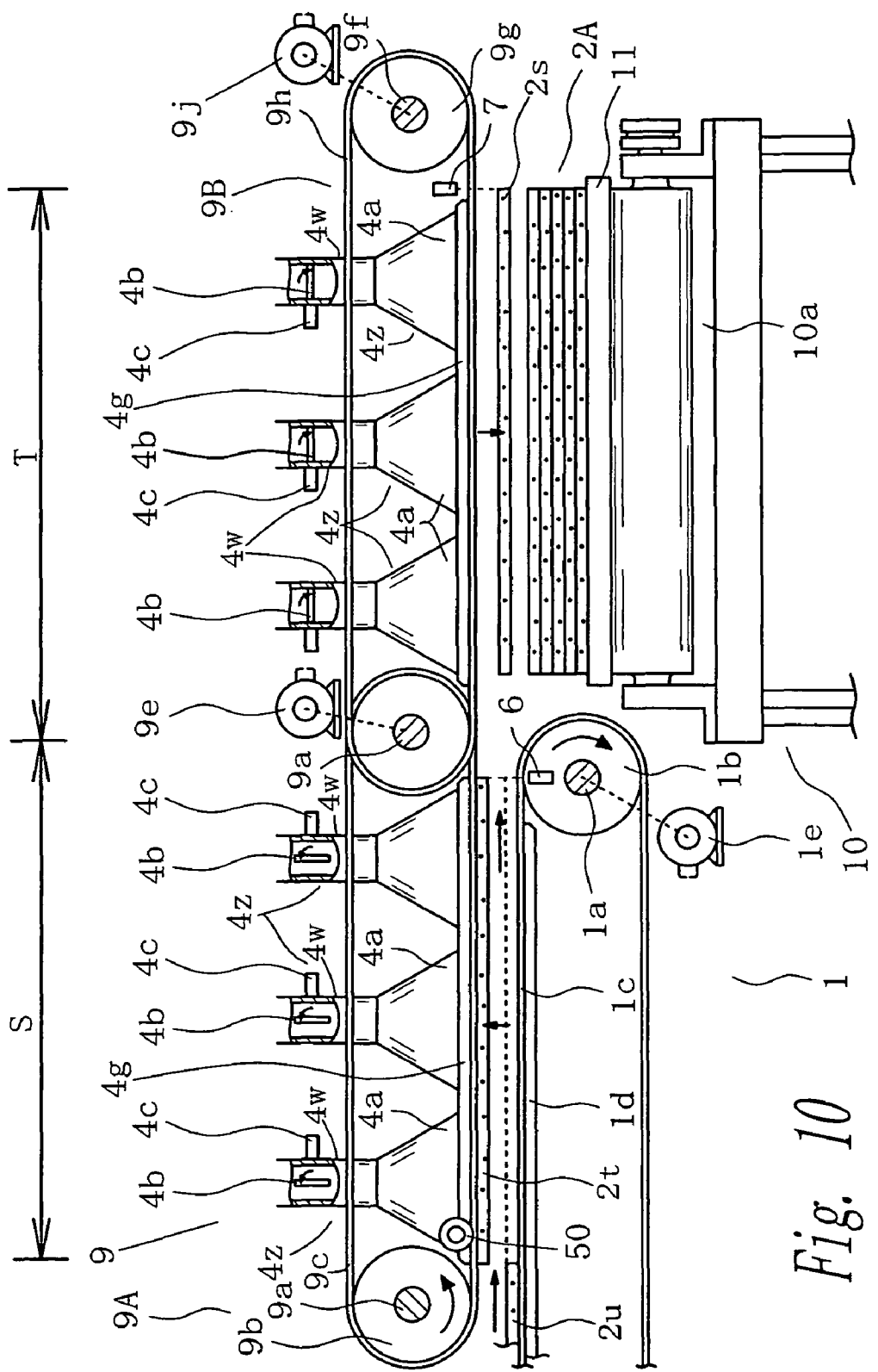
FIGS. 10 through 13 are illustrative views showing different steps of operation of the sheet conveying apparatus of FIG. 8.

In the meantime, the veneer sheet 2t following the veneer sheet 2s is conveyed at the speed v1 by the first conveyer 1 toward the S region of the upstream conveyer 9A, as shown in FIG. 8. When the leading end of the veneer sheet 2t is detected by the first sheet sensor 6, the control unit 8A actuates simultaneously the air cylinders 4c of the suction members 4z for the S region and also the air cylinders 51 for the rollers 50 in the same manner as in the first embodiment, with the result that the veneer sheet 2t is lifted in its entire width and held by suction against the conveyer belts 9c of the upstream conveyer 9A and conveyed at the speed v2 in arrow sheet conveying direction, as shown in FIG. 10.

Figure 11:
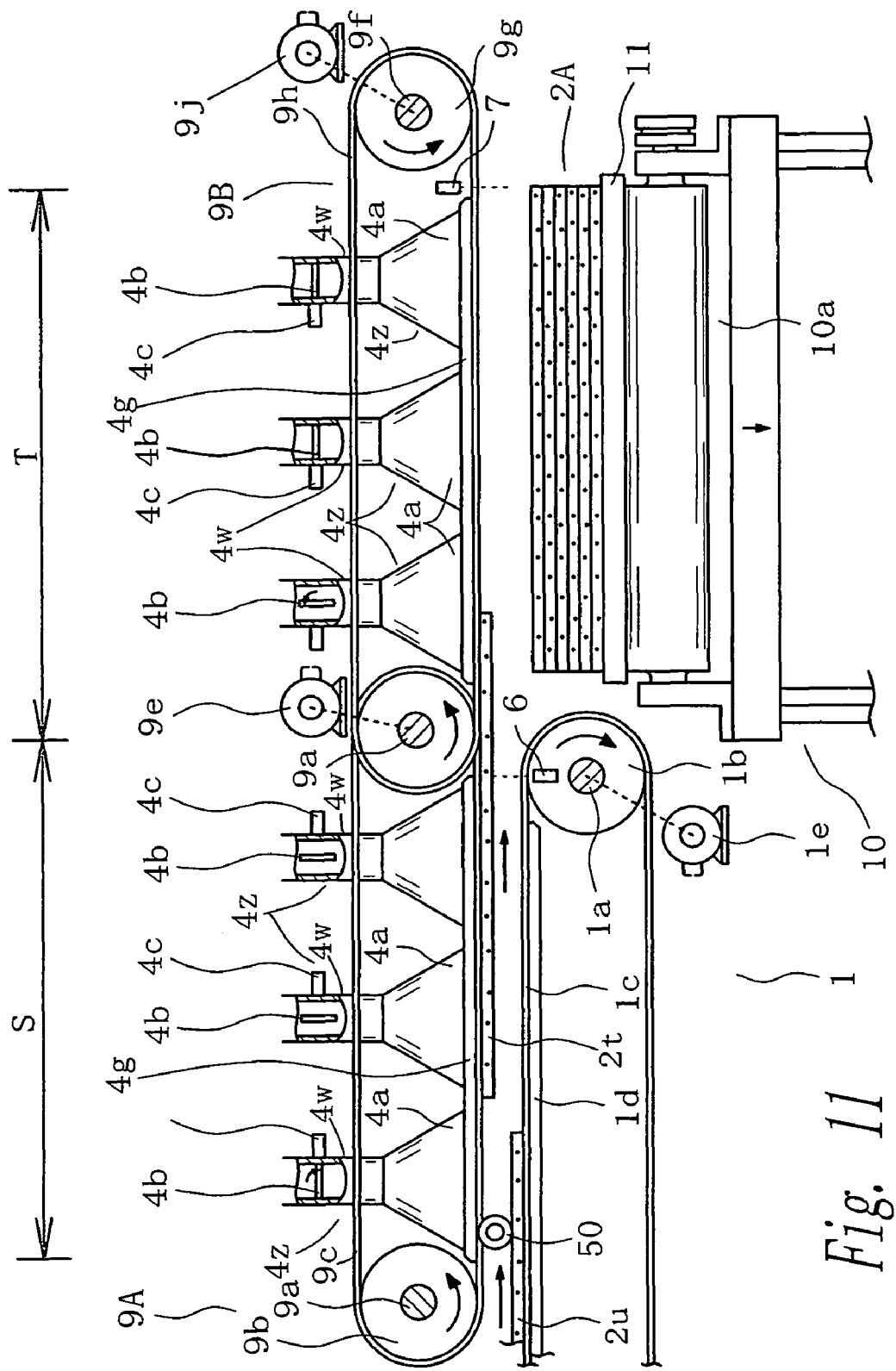
Figure 12:
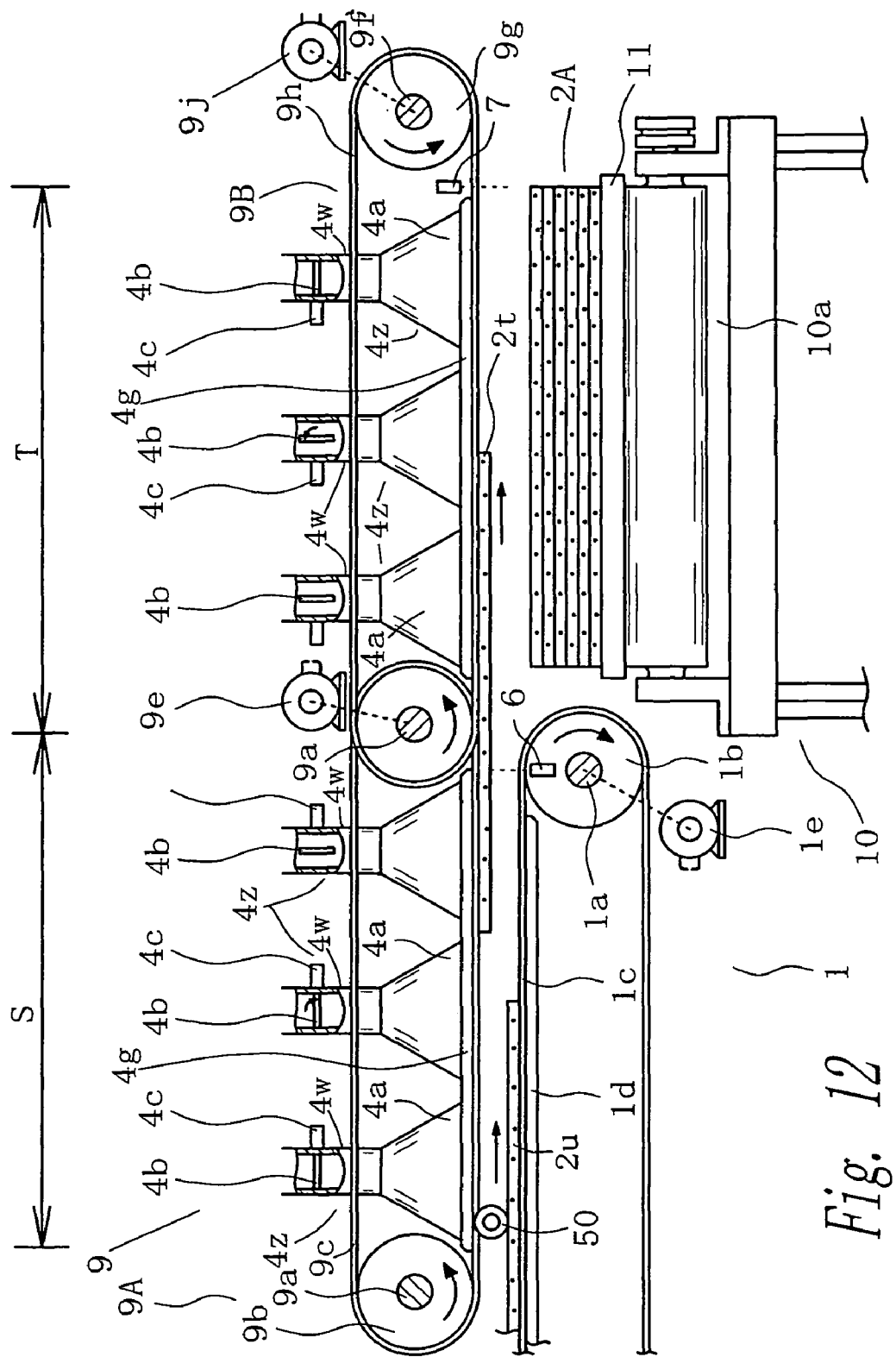
Figure 13:
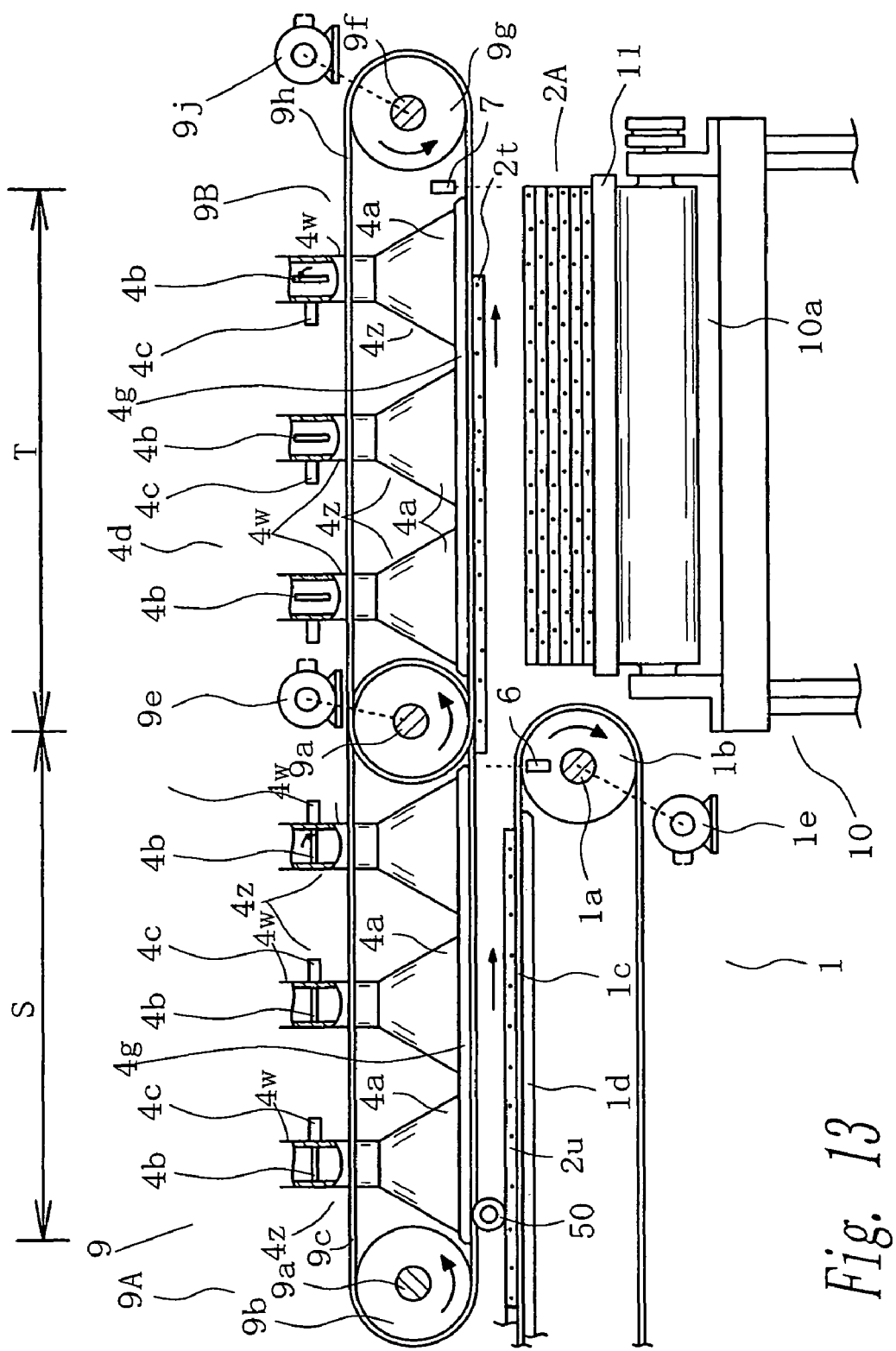

The control unit 8A receiving the above detection signal from the first sensor 6 generates a series of command signals successively through its incorporated delay circuit. Specifically, the command signals are generated by the control unit 8A to start the electric motor 9j for driving the downstream conveyer 9B and also to actuate the cylinders 4c of the suction members 4z for the S region and the T region so as to close valves 4b for the S region and to open the valves 4b for the T region in synchronism with the movement of the veneer sheet 2t as described in detail with reference to the first embodiment for ensuring stability in conveying the veneer sheet by the second conveyer 9. Thus, the veneer sheet 2t is conveyed toward the releasing position immediately above the stacking stand 10, as shown in FIGS. 11 through 13. When the leading end of the veneer sheet 2t is detected by the second sheet sensor 7, the conveyer belts 9h are stopped, which is immediately followed by deactivation of suction at the suction nozzles 4a for the T region. As a result, the veneer sheet 2t is dropped by its own weight from the downstream conveyer 9B of the second conveyer 9 onto the top of the veneer sheet pile 2A.

Though the description of the rollers 50 has been omitted, they are operated in substantially the same manner as the counterparts of the first embodiment.

The above-described steps of operation are repeated to convey and stack a series veneer sheets successively. As obvious from the foregoing, this second embodiment offers the same effects as the first embodiment.

In the first embodiment, a veneer sheet being conveyed by the second conveyer 3 is released therefrom positively by using the releasing mechanism 5 and stacked onto a veneer sheet pile 2A. In such an arrangement, the error in the position in the sheet conveying direction at which veneer sheets are released is large, as a result of which veneer sheets fail to be stacked into a neat pile due to their displacement relative to stacking position. This will make troublesome the subsequent veneer sheet handling operation. In the second embodiment according to which each veneer sheet moved by the downstream conveyer 9B is stopped before it is released, however, the aforementioned error and hence the displacement of veneer sheets can be reduced.

Though the second embodiment dispenses with the veneer sheet releasing mechanism such as 9 of the first embodiment, however, the use of the releasing mechanism positively releasing the veneer sheet from a conveyer belt is advantageous in that veneer sheet releasing can be done rapidly and the time required for stacking a given number of veneer sheets be reduced, accordingly.

Figure 14:
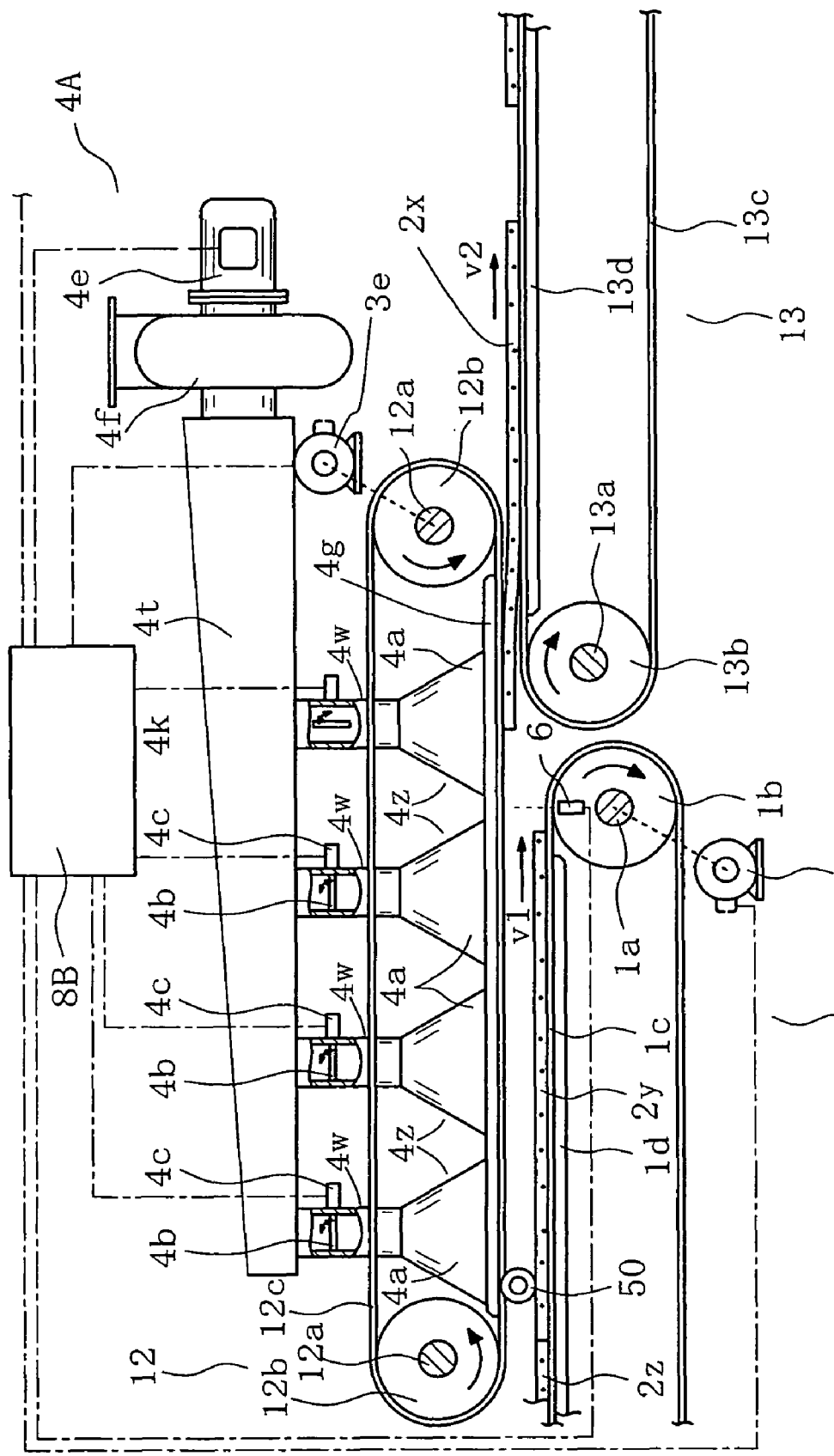
FIG. 14 is a side view showing a third embodiment of a sheet conveying apparatus according to the present invention.
Figure 15:
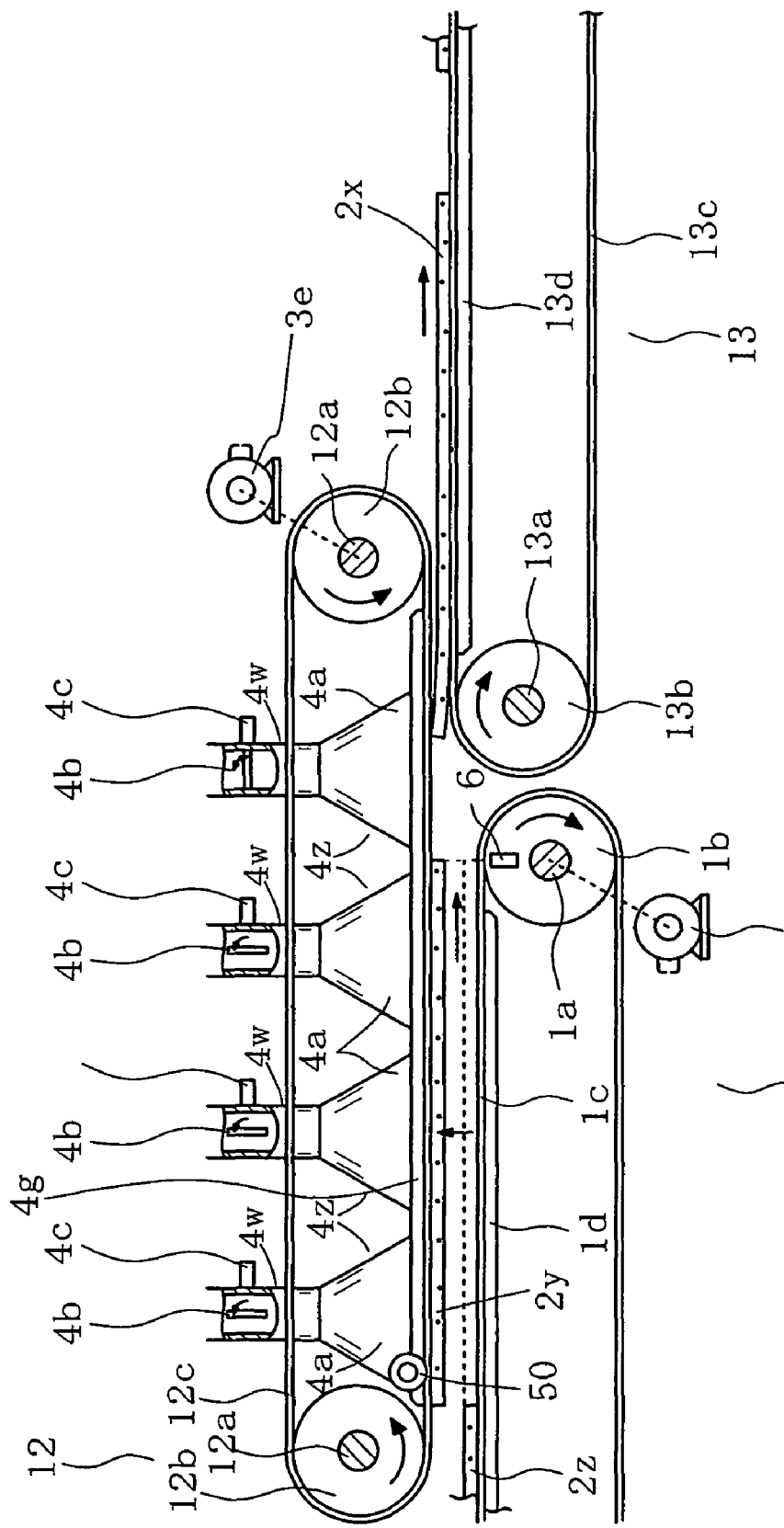
FIGS. 15 and 16 are illustrative views showing different steps of operation of the sheet conveying apparatus of FIG. 14.
Figure 16:
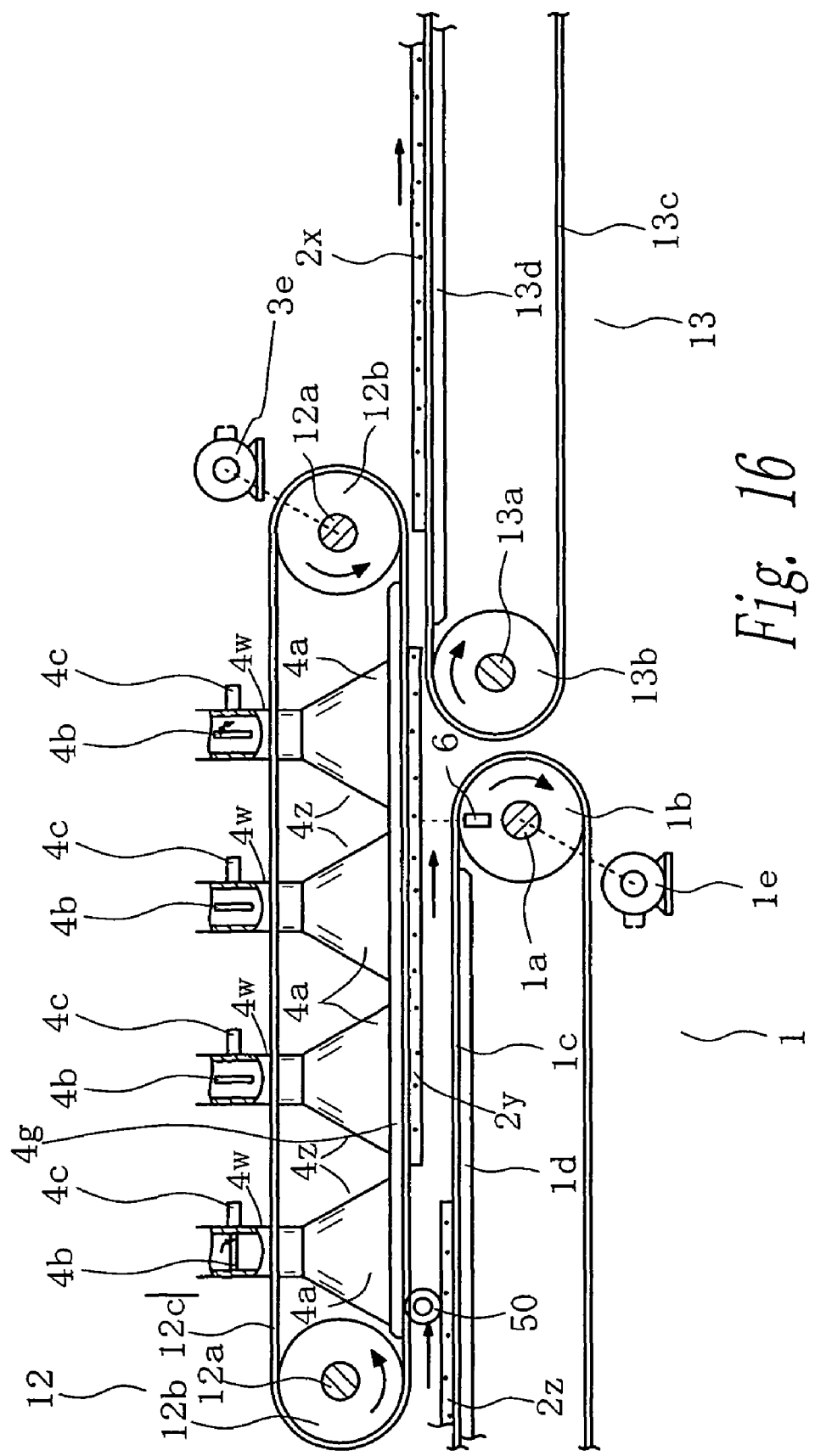

The following will describe the third embodiment of the present invention with reference to FIGS. 14 through 16.

The sheet conveying apparatus of the third embodiment has substantially the same first conveyer 1 having the conveyer belts 1c traveling at the speed v1 as the first conveyer of the first and second embodiments. The third embodiment differs from the first embodiment in that the second conveyer 3 of the first embodiment is substituted by a second conveyer 12 which is constructed shorter than the second conveyer 3. Accordingly, the closed duct 4t of the suction mechanism 4A is made shorter as compared with the duct 4d of the first embodiment. As shown in FIG. 14, four suction members 4z are connected to the duct 4d. The second conveyer 12 is spaced above the first conveyer 1 at a distance that is greater than the thickness of the veneer sheet and disposed overlapping with the first conveyer 1 at least for a distance corresponding to the width of a veneer sheet, e.g. 2y (FIG. 14) as measured in the sheet conveying direction. The second conveyer 12 has conveyer belts 12c (only one belt being shown) wound between the pulleys 12b fixedly mounted on the rotary shafts 12a one of which is driven by the electric motor 3e. As in the first embodiment, the conveyer belts 12c of the second conveyer 12 are driven constantly to travel at the speed v2 that is faster than the speed v1 of the conveyer belts 1c of the first conveyer 1.

The sheet conveying apparatus of the third embodiment also differs from the first embodiment in that the stacker is dispensed with and a third conveyer 13 is provided instead at a position below the second conveyer 12 and adjacent to the downstream ends of the first conveyer 1 and the second conveyer 12. The third conveyer 13 includes a conveyer belt 13c wound between a pair of pulleys 13b (only one pulley being shown in the drawing) fixedly mounted on a pair of shafts 13a (only one shaft being shown) one of which is driven by an electric motor (not shown) for driving the conveyer belt 13c at the speed v2. As shown in FIG. 14, the third conveyer 13 is provided overlapping with the second conveyer 12 over a short distance and spaced from the second conveyer 12 at a spaced distance that is slightly greater than the thickness of a veneer sheet. The paired rollers 50 and the control unit 8B are substantially the same as the counterparts of the first embodiment. The apparatus includes the control unit 8B and the first sheet sensor 6, dispenses with the second sheet sensor 7.

The following will describe the operation of the veneer sheet conveying apparatus of the third embodiment. The description of the operation will begin from the state of the apparatus as shown in FIG. 14, wherein the valves 4b of the first three suction members 4z as counted from the upstream end of the second conveyer 12 are closed and a veneer sheet 2x being conveyed by the second conveyer 12 with its trailing end held by suction of the fourth suction member 4z whose valve 4b is opened is being transferred from the first conveyer 1 to the third conveyer 13. A plurality of veneer sheets 2y, 2z and so forth are being conveyed by the first conveyer 1.

When the veneer sheet 2y is moved further by the first conveyer 1 to reach the position where its leading end is detected by the first sheet sensor 6, a detection signal is transmitted from the first sensor 6 to the control unit 8B. The control unit 8 receiving such detection signal actuates simultaneously the air cylinders 4c of the above three suction members 4z so as to open their corresponding valves 4b thereby to activate suction at such suction members 4z. As a result, the veneer sheet 2y is lifted in its entire width and held by suction against the conveyer belts 12c of the second conveyer 12, as shown in FIG. 15. The control unit 8B actuates the air cylinder 4c of the fourth suction member 4z so as to close its valve at such a time when substantially the entire veneer sheet 2x has been transferred to the third conveyer 13.

The veneer sheet 2y thus lifted from the first conveyer 1 is then conveyed at the faster speed v2 by the second conveyer 12. Further, the control unit 8B provides a command signal with a delay to actuate the air cylinder 4c for the fourth suction member 4z so as to open its valve 4b just before the leading end of the veneer sheet 2y reaches the suction nozzle 4a of that fourth suction member 4z and also a series of signals to actuate the air cylinders 4c so as to close the valves 4b in synchronism with the movement of the veneer sheet 2y for the reason stated earlier herein.

In the meantime, the veneer sheet 2y held against the conveyer belts 12c of the second conveyer 12 enters a region between the lower leg of the conveyer belts 12 of the second conveyer and the upper leg of the conveyer belt 13c of the third conveyer 13, as shown in FIG. 16, and moved further as its preceding veneer sheet 2x.

As is obvious from the foregoing, veneer sheets being transferred from the first conveyer 1 to the second conveyer 12 are subjected to no damaging tension acting in the sheet conveying direction and the spaced distance between any two adjacent veneer sheets being conveyed can be enlarged without braking the veneer sheets.

The following will describe the fourth embodiment of the present invention with reference to FIGS. 17 through 22.

The feature of the fourth embodiment resides in that selected veneer sheets out of a series of veneer sheets conveyed by the first conveyer are continued to be moved by the first conveyer without being transferred to the second conveyer. In the fourth embodiment, it is so arranged that every other sheet continues to be conveyed by the first conveyer.

Figure 17:
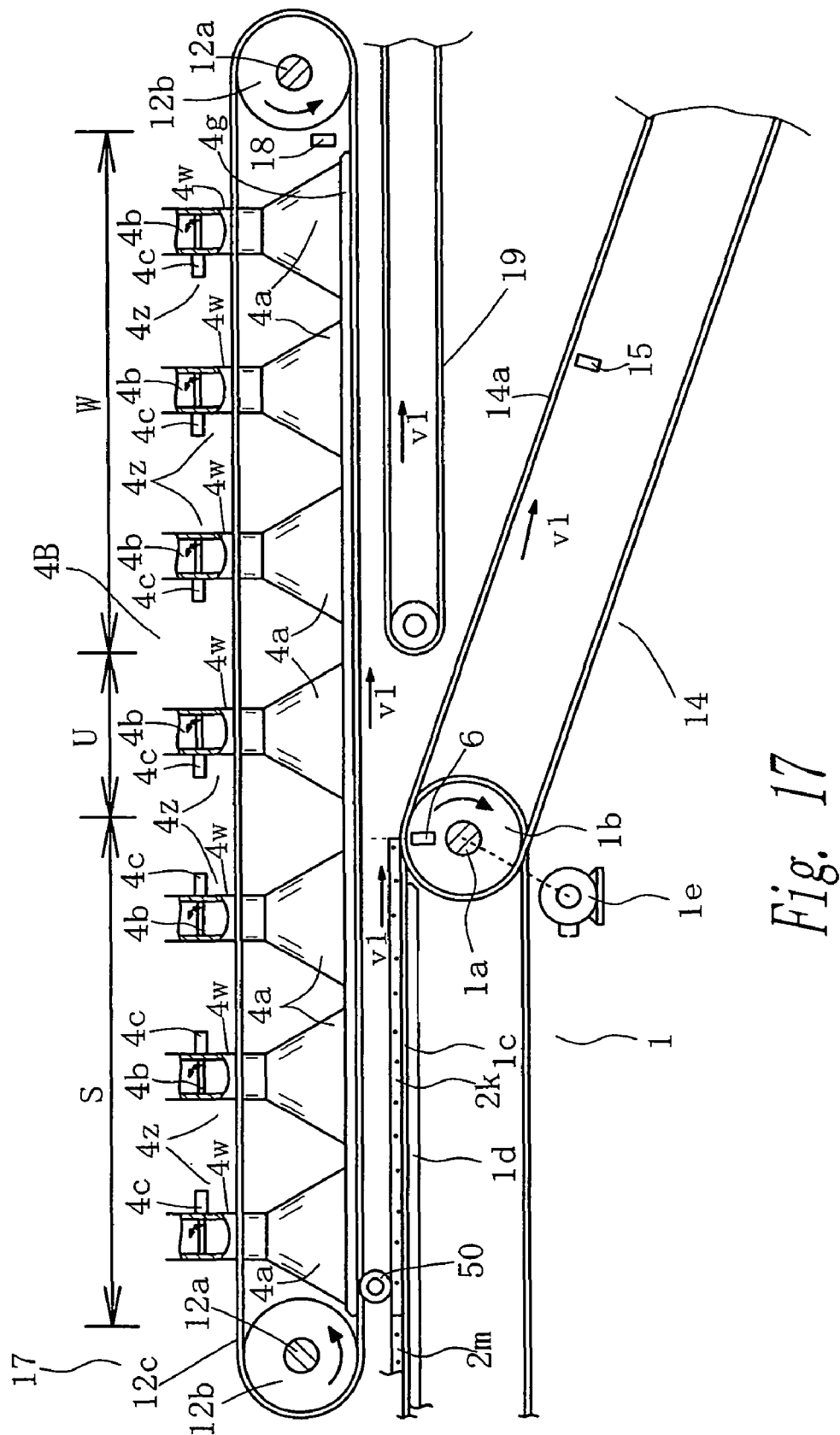
FIG. 17 is a side view showing a fourth embodiment of a sheet conveying apparatus according to the present invention.

Referring to FIG. 17, the first conveyer 1 includes the conveyer belts 1c driven to travel at the speed v1 and a sloped extension conveyer 14 having conveyer belts 13a one end of which is wound around the pulley 1b. The first sheet sensor 6 is provided for detecting the leading end of an incoming veneer sheet such as 2k moved by the conveyer belts 1c of the first conveyer 1. The sloped conveyer belts 14a of the sloped extension conveyer 14 is inclined downward from the pulley 1b and traveling at the same speed v1 as the conveyer belts 1c. A third sheet sensor 15 is located adjacently to the upper leg of the sloped conveyer belt 14a at a position spaced from the first sheet sensor 6 at a distance that substantially corresponds to the width of a veneer sheet 2k as measured in the sheet conveying direction.

The second conveyer 17 of the fourth embodiment has the same pairs of conveyer belts 12c as the counterparts belts 3c of the first embodiment, drive to travel constantly between the pulleys 12b mounted on the rotary shafts 12a at the speed v1 in arrow direction. The second sheet sensor 18 is provided at a position adjacent to the downstream end of the second conveyer 17 for detecting the leading end of a veneer sheet being moved by the second conveyer 17. A suction mechanism 4B having seven suction members 4z is provided for the second conveyer 17 in the same manner as in the first embodiment, although vacuum devices 4f and the closed ducts 4d are omitted from the drawing for the sake of clarity of illustration. For the sake of description, the second conveyer 17 is divided into three regions S, U and W. Namely, the range covering the first three suction members 4z as counted from the upstream end of the second conveyer 17 with respect to the sheet conveying direction will be referred to as S region, the range covering fourth suction member 4z as U region, and the range covering the last three suction members 4z as W region, respectively.

A third delivery conveyer 19 is arranged below the W region of the second conveyer 17, having a conveyer belt running constantly at the speed v1. The paired rollers 50 (only one roller being shown) are arranged substantially in the same manner as the counterparts of the first embodiment. Though not shown in the drawing, a control unit is provided for controlling the operation of the valves 4b of the respective suction members 4z and the roller 50 in response to signals from the sheet sensors 6, 15, 18, as will be described later.

The following will describe the operation of the veneer sheet conveying apparatus of the fourth embodiment. The description of the operation will begin from the state of the apparatus as shown in FIG. 17, wherein the valves 4b of the suctions members 4z for three regions S, U and W are all closed and a plurality of veneer sheets 2k, 2m and so forth are being conveyed by the first conveyer 1. The veneer sheet 2k on the first conveyer 1 has just reached a position where its leading end is detected by the first sheet sensor 6.

Figure 18:
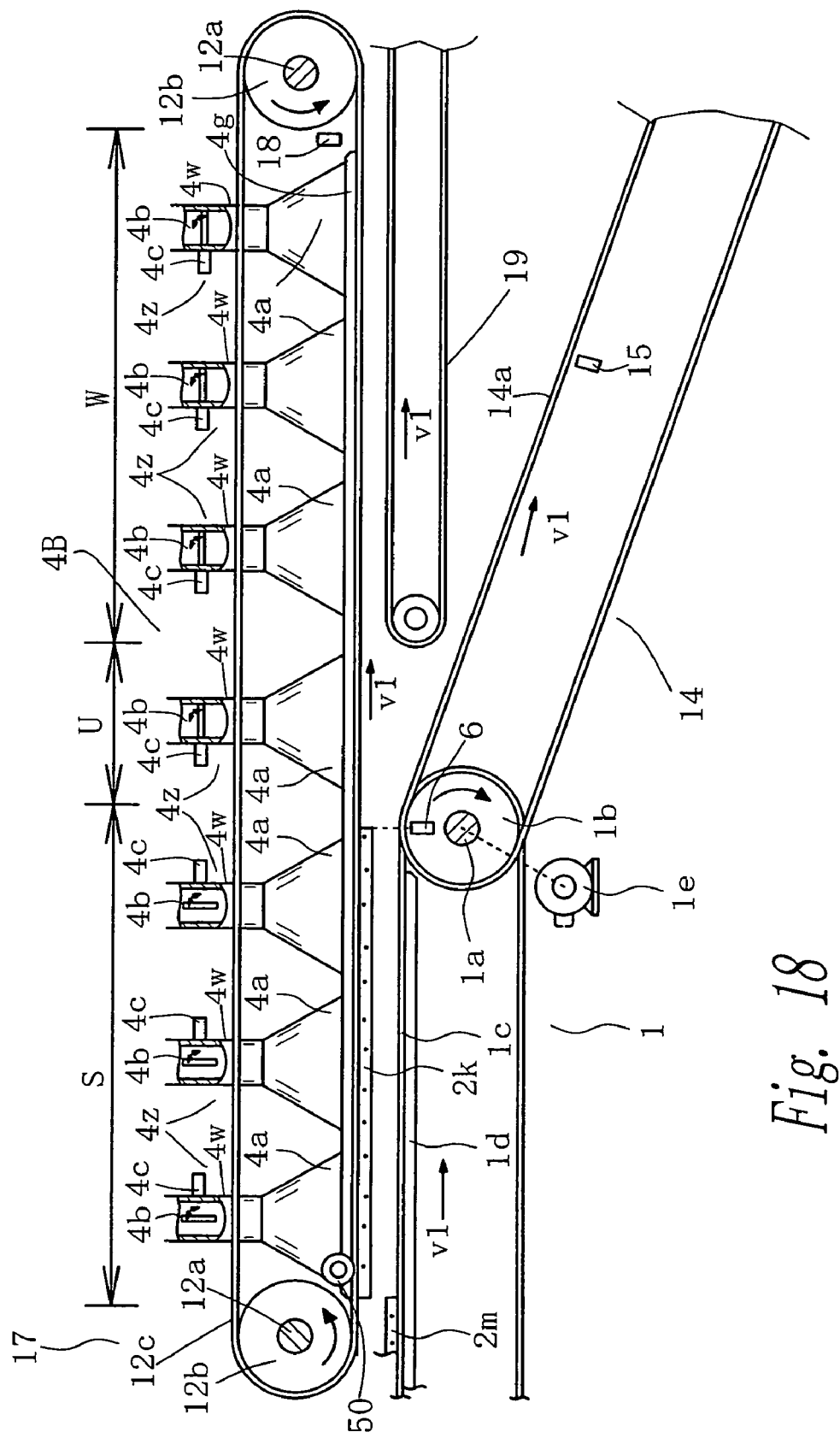
FIGS. 18 through 22 are illustrative views showing different steps of operation of the sheet conveying apparatus of FIG. 17.

When the first sheet sensor 6 detects the leading end of the incoming veneer sheet 2k, the control unit (not shown) provides command signals to actuate simultaneously the air cylinders 4c for three suction members 4z for the region S so as to open their valves 4b. The veneer sheet 2k is lifted and held by suction against the conveyer belts 12c of the second conveyer 12, as shown in FIG. 18, and then conveyed forward in arrow direction at the speed v1. As described earlier with reference to the foregoing embodiments, for ensuring stability in conveying of veneer sheet, the operation of the valves 4b to open and close is controlled by the control unit in conjunction with the movement of the veneer sheet 2k.

Figure 19:
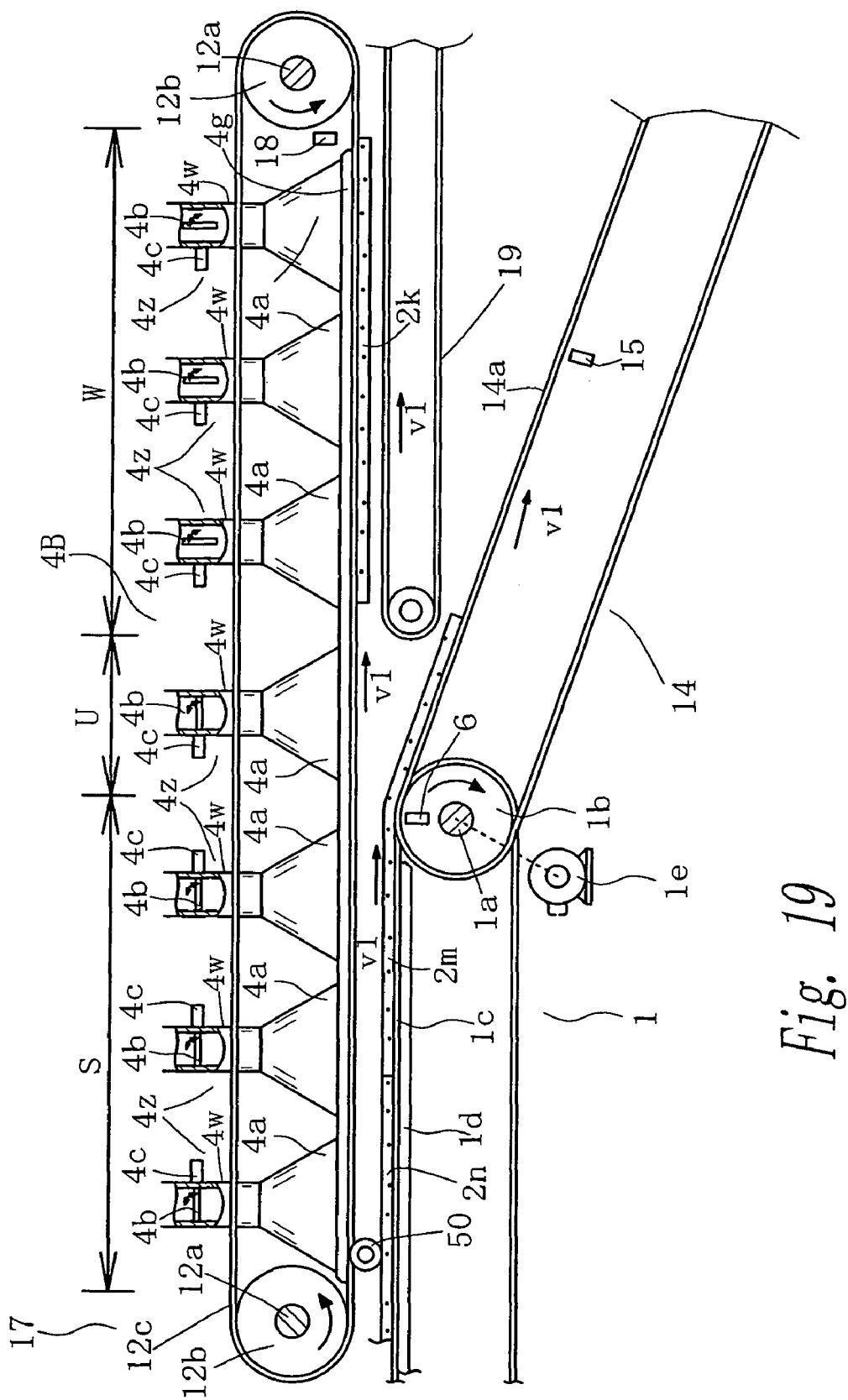
Figure 20:
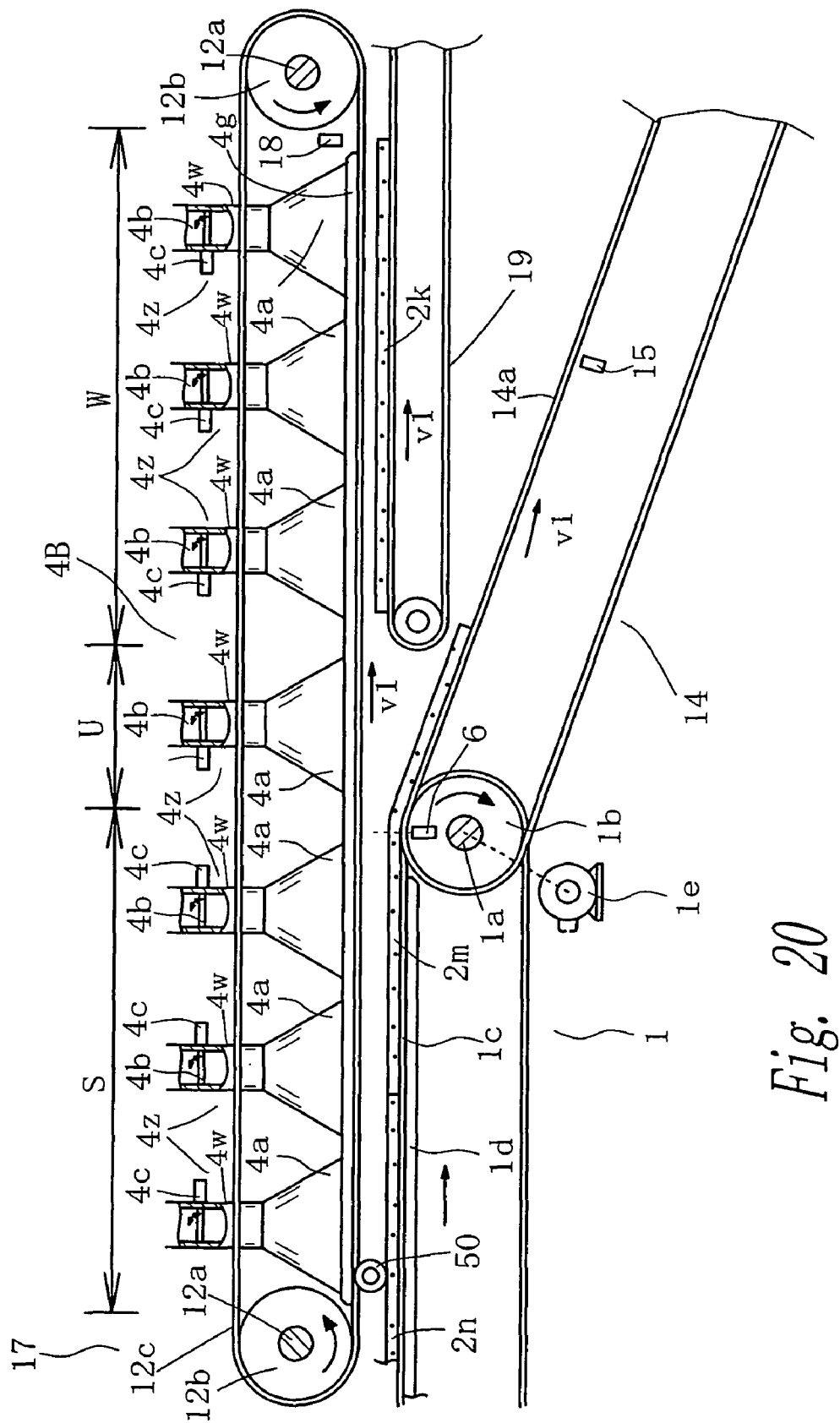

In the mean time, the veneer sheet 2k is further moved by the second conveyer 17 to a position where its leading end is detected by the second sensor 18, as shown in FIG. 19. In the state of FIG. 19, the valves 4b of the suction members 4z for the regions S and U of the second conveyer 17 are all closed. The control unit responding to a detection signal from the sensor 18 actuates the air cylinders 4c of the suction members 4z for the region W of the second conveyer 17 so as to close their valves 4b simultaneously. Therefore, the veneer sheet 2k is released from the second conveyer 17 and dropped off by its own weight from the conveyer belts 12c of the second conveyer 17 onto the third delivery conveyer 19, as shown in FIG. 20, and conveyed further by the third delivery conveyer 19 at the same speed v1 to any subsequent working station outside the apparatus.

In the case of the veneer sheet 2m following the sheet 2k, when its leading end is detected by the first sheet sensor 6, no signal is generated for actuating the air cylinders 4c so as to open the valves 4b of the suction members z for the region S of the second conveyer 17. Therefore, the veneer sheet 2m is transferred to the sloped extension conveyer 14, as shown in FIG. 19 without being lifted to the second conveyer 17. The veneer sheet 2m is followed by a veneer sheet 2n.

Figure 21:
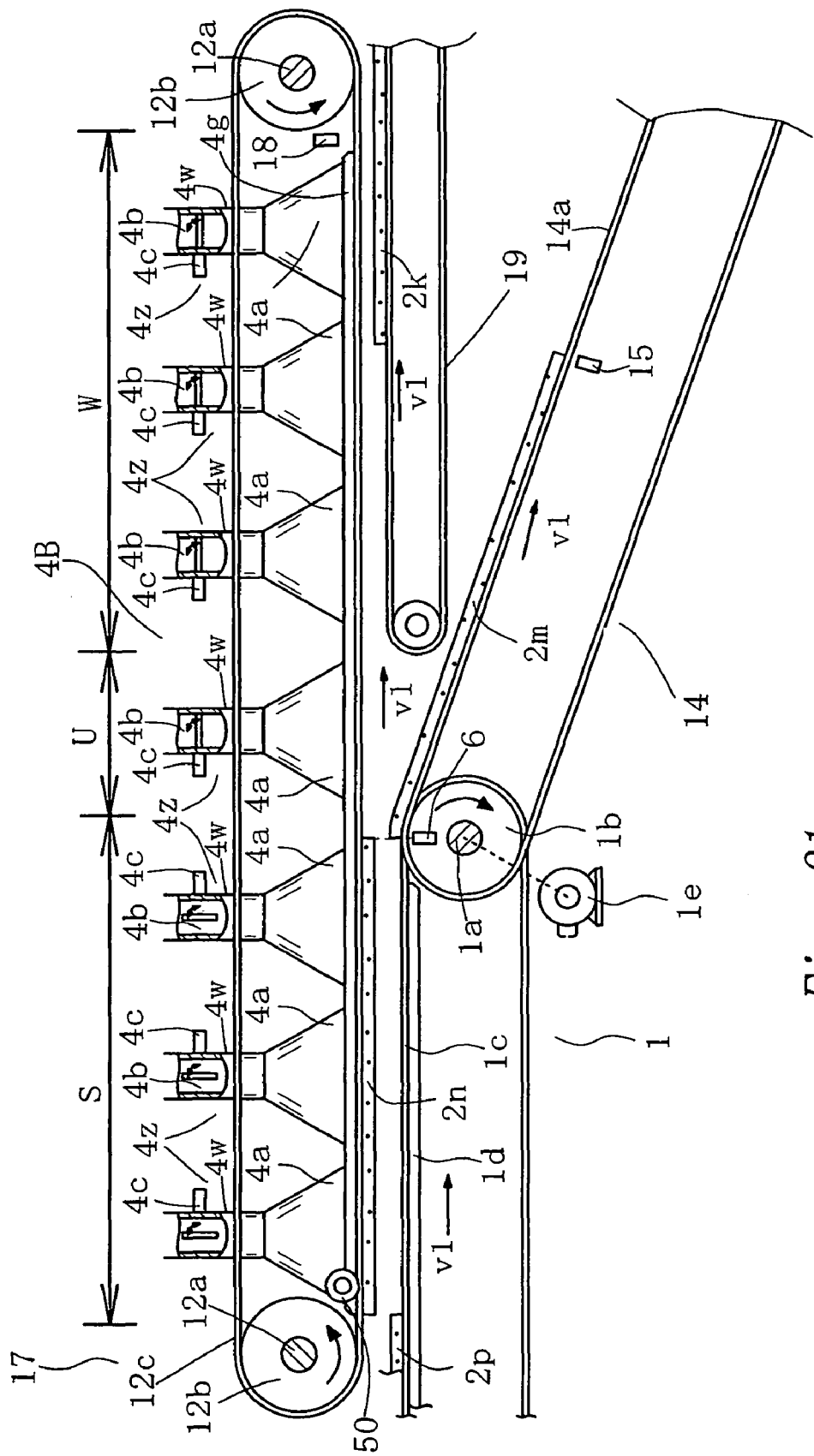
Figure 22:
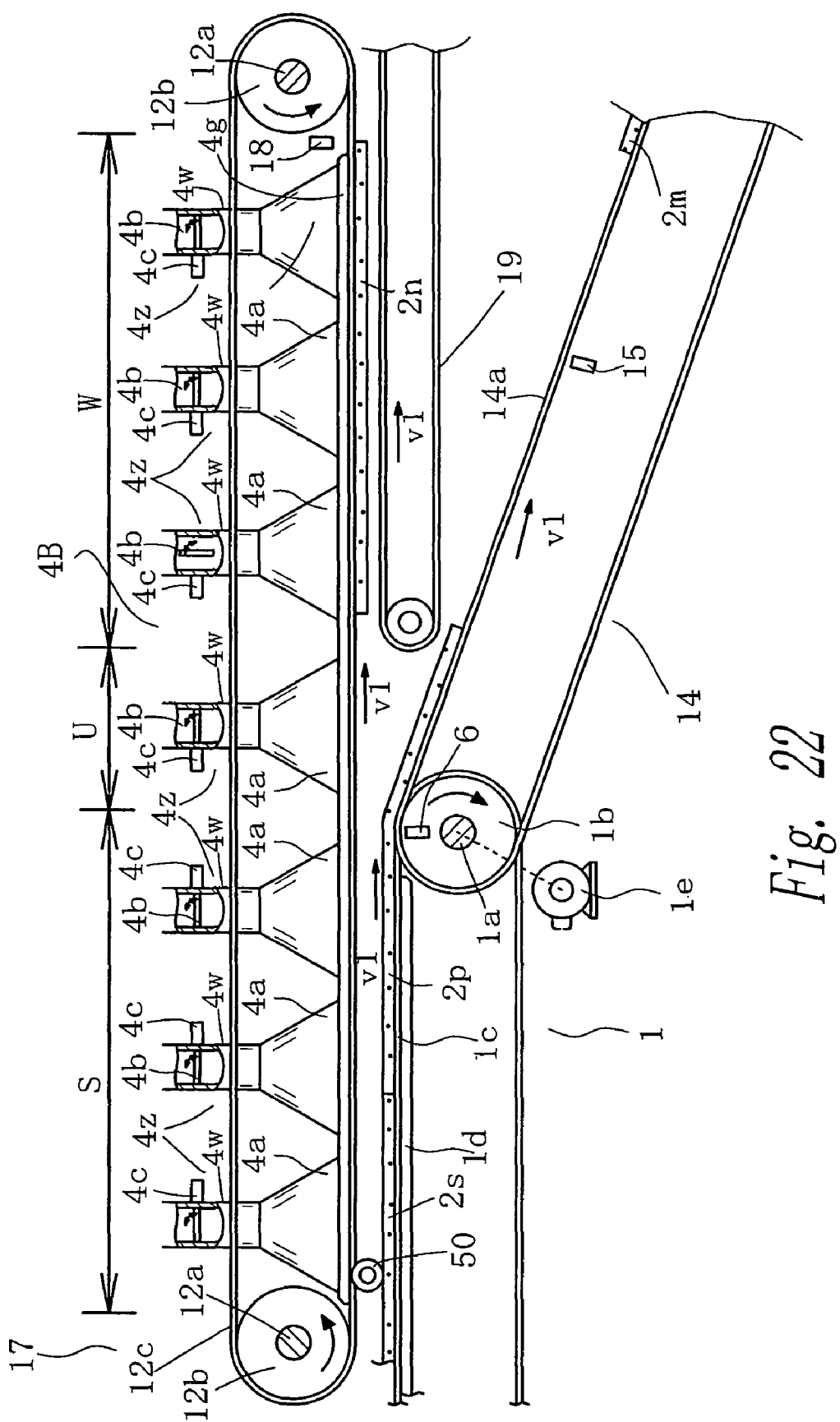

When the leading end of the veneer sheet 2m moved by the sloped extension conveyer 14 is detected by the third sheet sensor 15, the control unit receiving a detection signal from the sensor 15 generates signals to actuate the air cylinders 4c of the suction members 4z for the S region so as to open their valve 4b simultaneously. The veneer sheet 2n is lifted and held by suction against the conveyer belts 12c of the second conveyer 12, as shown in FIG. 21, and moved forward in arrow direction at the speed v1 in the same manner as the veneer sheet 2k. When the veneer sheet 2n is conveyed by the second conveyer 17 to a position as shown in FIG. 22, it is released and dropped onto the third delivery conveyer 19 and moved at the speed v1 to the subsequent station outside the apparatus in the manner as described with reference to the preceding veneer sheet 2k.

The above-described steps of operation are repeated to convey a series of veneer sheets alternately to two different conveying passages, namely the sloped extension conveyer 14 of the first conveyer 1 and the third delivery conveyer 19.

The sheet conveying apparatus of this embodiment may use a veneer sheet releasing mechanism such as 5 having releasing plates 5a of the first embodiment for positively releasing veneer sheets from the second conveyer 17.

The following will describe the fifth embodiment of the present invention with reference to FIGS. 23 through 27.

The sheet conveying apparatus of this fifth embodiment differs from the foregoing embodiments in that the second conveyer to which a veneer sheet is transferred is disposed spaced below the first conveyer. Accordingly, a veneer sheet being conveyed by the first conveyer is supported thereby with the upper surface of the veneer sheet held by suction against the first conveyer and then transferred by being dropped to the second conveyer.

Figure 23:
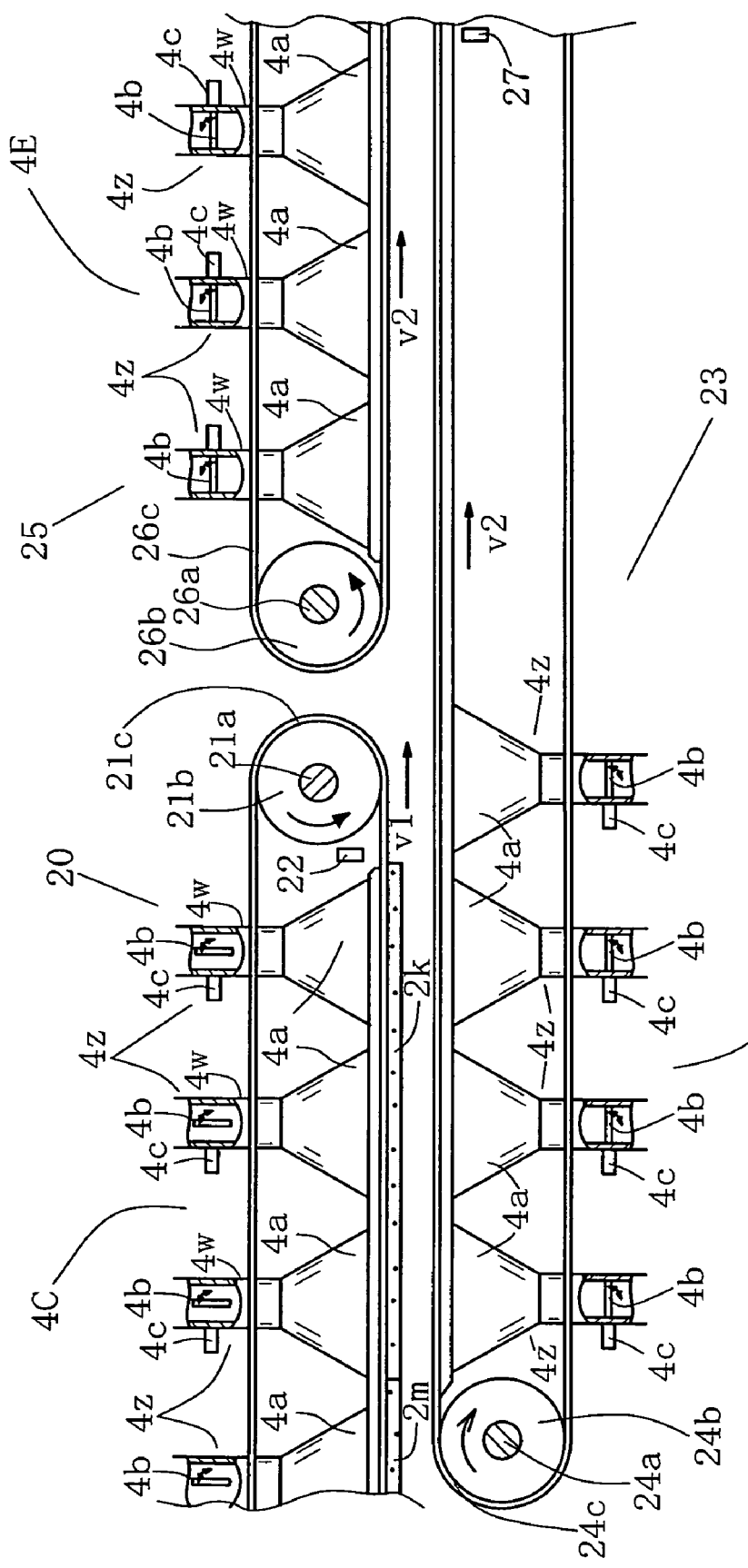
FIG. 23 is a side view showing a fifth embodiment of a sheet conveying apparatus according to the present invention.

Referring to FIG. 23, reference numeral 20 designates a first conveyer having two pairs of conveyer belts 21c (only one belt being shown in the drawing) provided in a similar arrangement to the case of conveyer belts 3c of the second conveyer 3 of the first embodiment (FIG. 2) and wound between the pulleys 21c fixed mounted on the rotary shafts 21a, each running at the speed v1 in arrow direction. A first sheet sensor 22 is located at a position adjacent to the downstream end of the second conveyer 21 for detecting the leading end of an incoming veneer sheet such as 2k conveyed by the first conveyer 20. A suction mechanism 4C having a plurality of suction members 4z is provided for the first conveyer 20, although vacuum devices 4f and their associated parts such as closed ducts 4d are omitted from the drawing for the sake of clarity of illustration.

Reference numeral 23 designates a second conveyer disposed below the first conveyer 20 and having a region overlapping therewith for a distance that is slightly greater than the width of a veneer sheet as measured in the sheet conveying direction. The second conveyer 23 has pairs of conveyer belts 24c (only one conveyer belt being shown in the drawing) driven to travel constantly between the pulleys 24b fixedly mounted on the rotary shafts 24a at the speed v2 in arrow direction. A suction mechanism 4D having four suction members 4z is provided for the second conveyer 23, although vacuum devices 4f and their associated closed ducts 4d are omitted from the drawing. As shown in FIG. 23, the suction members 4z of the suction mechanism 4D are disposed with the suction nozzles 4a facing upward in contact with the lower surfaces of the upper leg of the conveyer belts 24c. The first three suction members 4z as counted from the upstream end of the second conveyer 23 are arranged in the above overlapping region corresponding to the distance that is slightly greater than the width of a veneer sheet and the fourth suction member 4z is located downstream of the third suction member 4z. A second sheet sensor 27 is located at an appropriate position for detecting the leading end of a veneer sheet being conveyed by the second conveyer 23.

Reference numeral 25 designates a third conveyer disposed adjacently to and substantially in alignment with the first conveyer 20 and overlapping with the second conveyer 23 at least over a distance that is larger than the width of a veneer sheet as measured in the sheet conveying direction. Like the first conveyer 20, the third conveyer 23 has two pair of conveyer belts 26c (only one conveyer belt being shown) driven to travel constantly between the pulleys 26b mounted on the rotary shafts 26a at the speed v2 in arrow direction. A suction mechanism 4E having a plurality of suction members 4z is provided for the third conveyer 25, although vacuum devices 4f and their associated closed ducts 4d are omitted from the drawing.

Though not shown in the drawing, a control unit is provided which receives detection signals from the first and second sheet sensors 22, 27 and controls the operation of the veneer sheet conveying apparatus. The apparatus of this embodiment dispenses with the rollers 50.

The following will describe the operation of the veneer sheet conveying apparatus of the fifth embodiment. The description of the operation will begin from the state of the apparatus as shown in FIG. 23, wherein the valves 4b of the suctions members 4z for the first conveyer 20 are all opened to hold by suction veneer sheets such as 2k, 2m, 2n and so forth against the conveyer belts 21c of the first conveyer 20, while the valves 4b of the suction members 4z for the second conveyer 23 and the third conveyer 25 are all closed.

Figure 24:
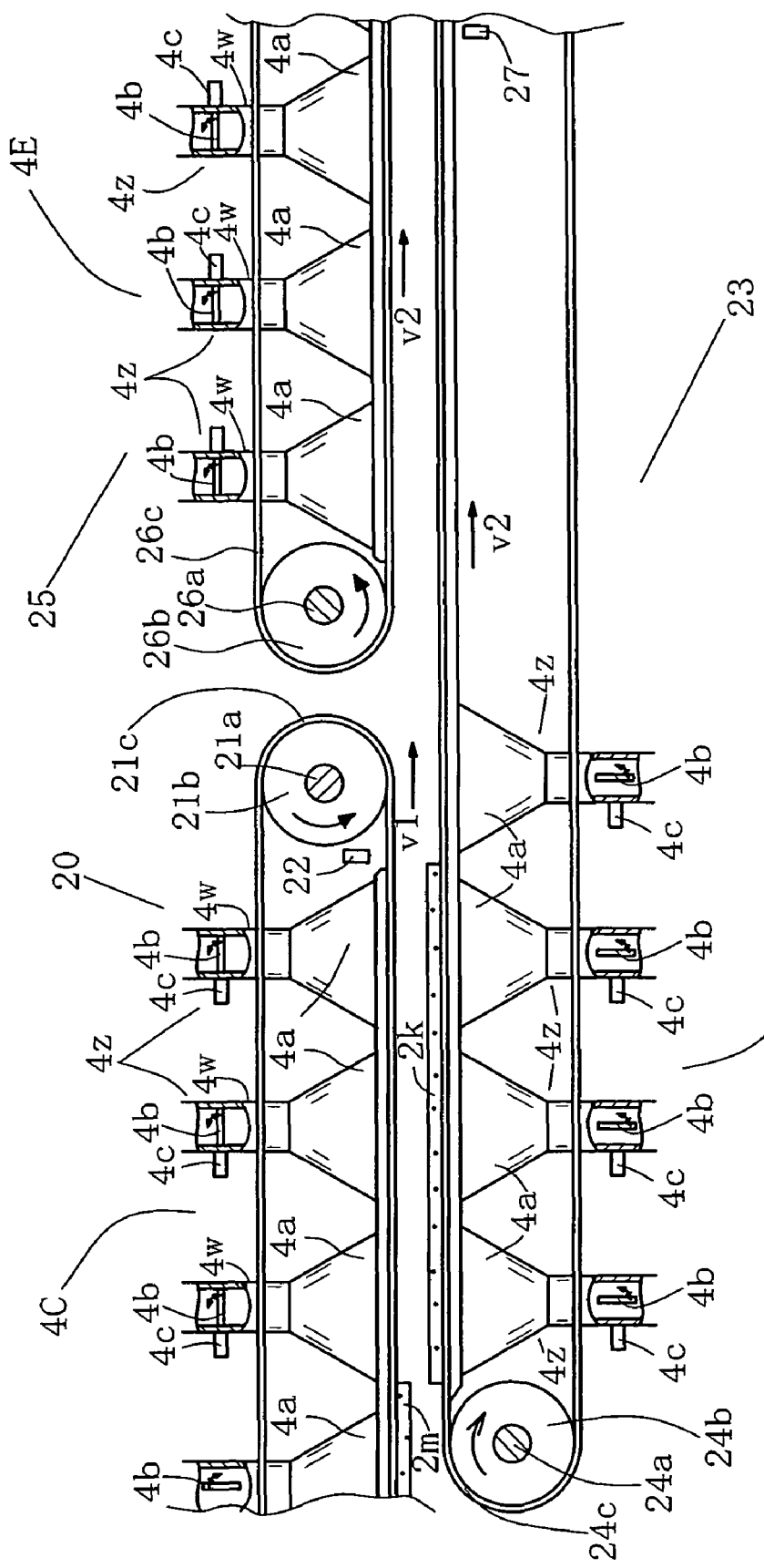
FIGS. 24 through 27 are illustrative views showing different steps of operation of the sheet conveying apparatus of FIG. 23.
Figure 25:
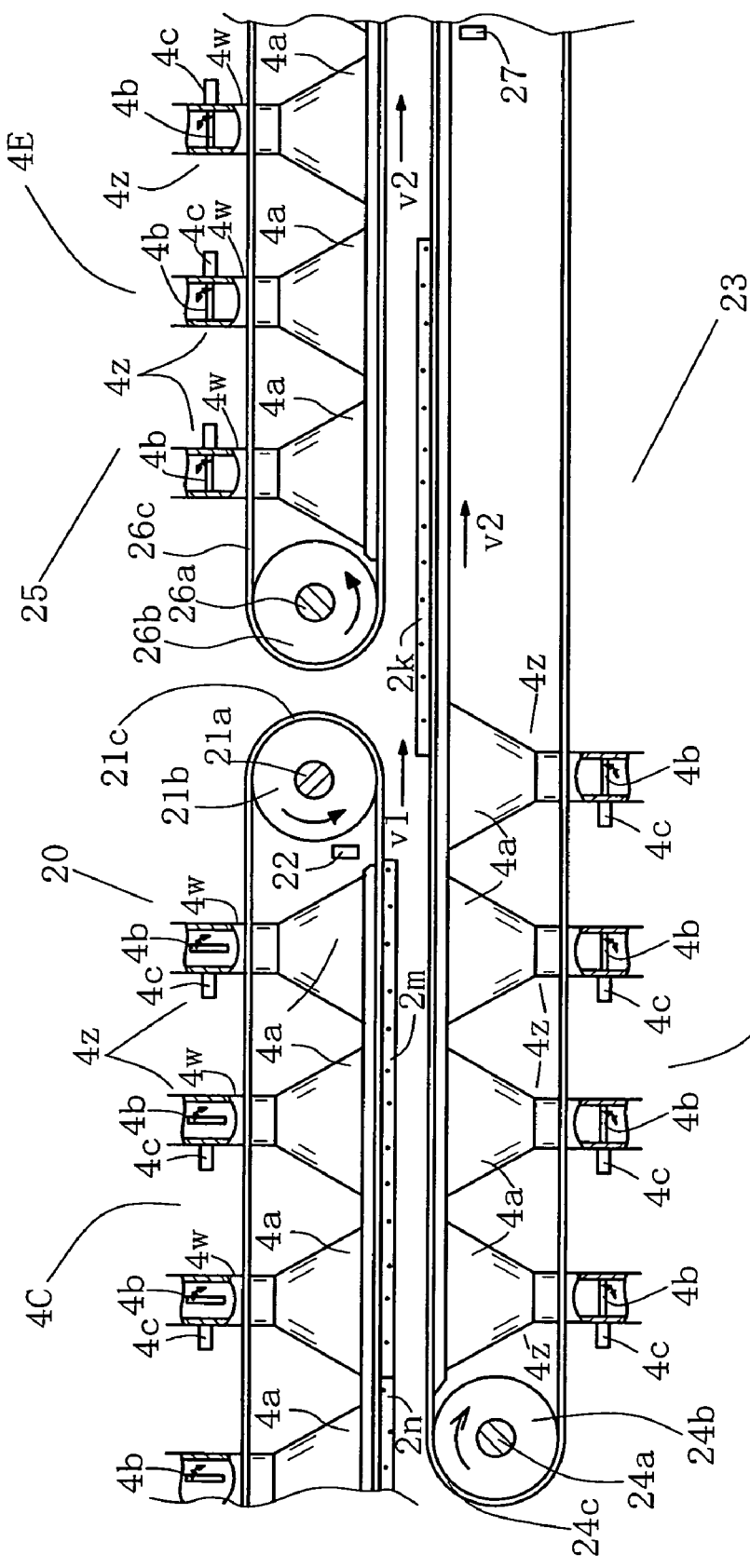

When the leading end of a veneer sheet 2k being conveyed by the first conveyer 20 is detected by the first sensor 22, the control unit (not shown) provides command signals to actuate the air cylinders 4c of those three suction members 4z for the first conveyer 20 which are located adjacent to the pulley 21b at the downstream end of the first conveyer 20 so as to close their valves 4b simultaneously and also to actuate the air cylinders 4c of the suction members 4z for the second conveyer 23 so as to be open their valve 4b, as shown in FIG. 24. As a result, the veneer sheet 2k is released or transferred from the first conveyer 20 to the first conveyer 23. In the transferring, the veneer sheet 2k is move also by attraction by suction of the suction mechanism 4D to the second conveyer 23. That is, the veneer sheet 2k is transferred to the second conveyer 23 by its own weight, as well as by suction acting to move the veneer sheet 2k downward. Thus, the veneer sheet 2k is held by suction against the moving conveyer belts 24c of the second conveyer 23, as shown in FIG. 24, so that the veneer sheet 2k is conveyed in arrow direction at the speed v2, as shown in FIG. 25. The valves 4b of the suction members 4z for the second conveyer 23 are closed successively in conjunction with the movement of the veneer sheet 2k for ensuring stability and smoothness in conveying of veneer sheets.

Figure 26:
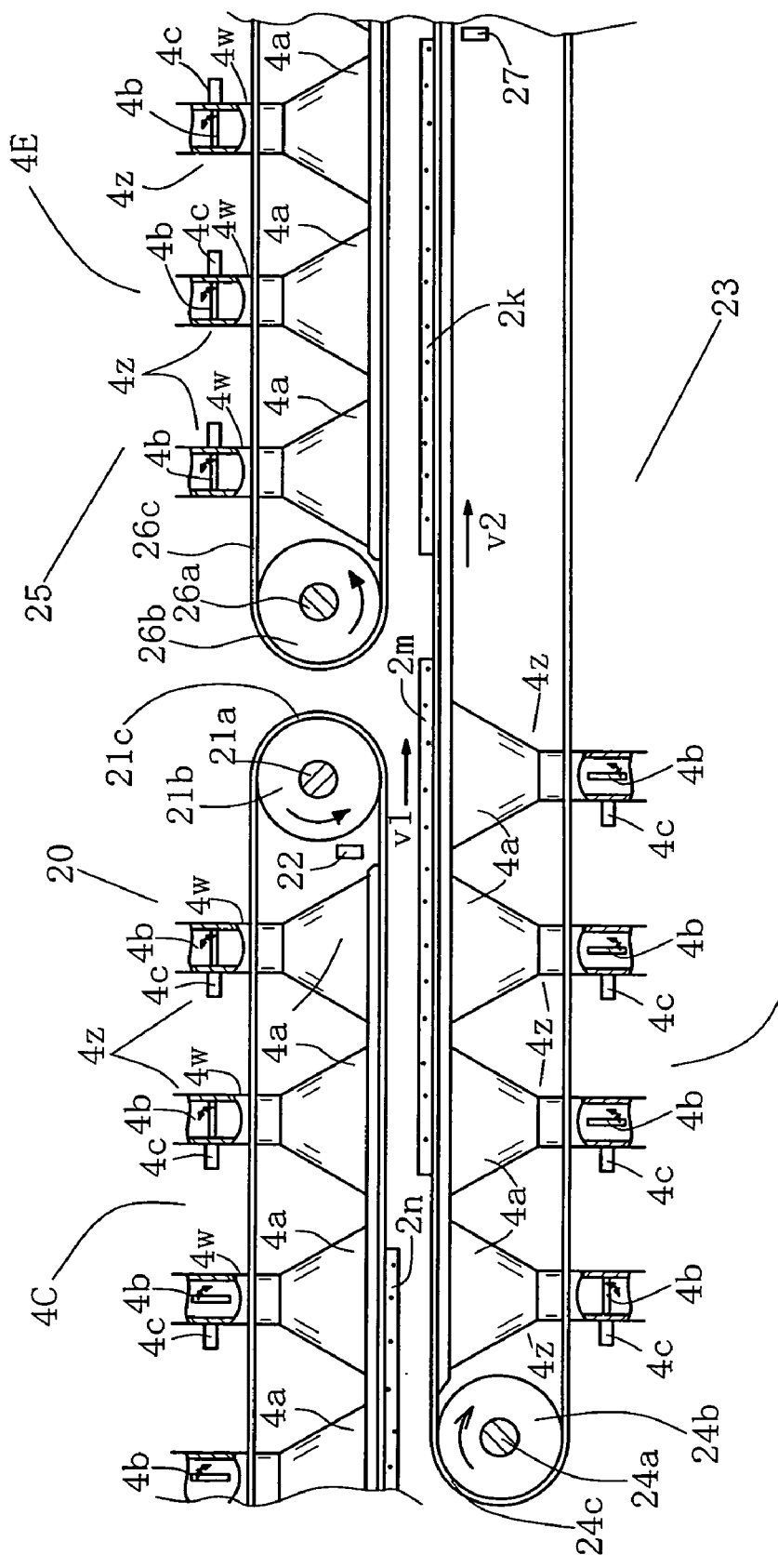

After elapse of a short period of time from the time of reception of the detection signal from the first sheet sensor 22, i.e. after the veneer sheet 2k has been transferred to and held by suction against the second conveyer 23, the control unit generates a series of command signals to actuate the air cylinders 4c of the aforementioned three suction members 4z for the first conveyer 20 so as to open their valves 4b successively in conjunction with the conveying movement of the next veneer sheet 2m. When the leading end of the veneer sheet 2m is detected by the first sensor 22, the veneer sheet 2m is transferred to the second conveyer 23, held against its conveyer belts 24c and conveyed in the sheet conveying direction at the speed v2 in the same manner as its preceding veneer sheet 2k, as shown in FIG. 26. Because of the difference of conveying speed between the first and second conveyers 20 and 23, a spaced distance is formed between the two adjacent veneer sheets 2k, 2m being conveyed by the second conveyer 23, as shown in FIG. 26.

Figure 27:
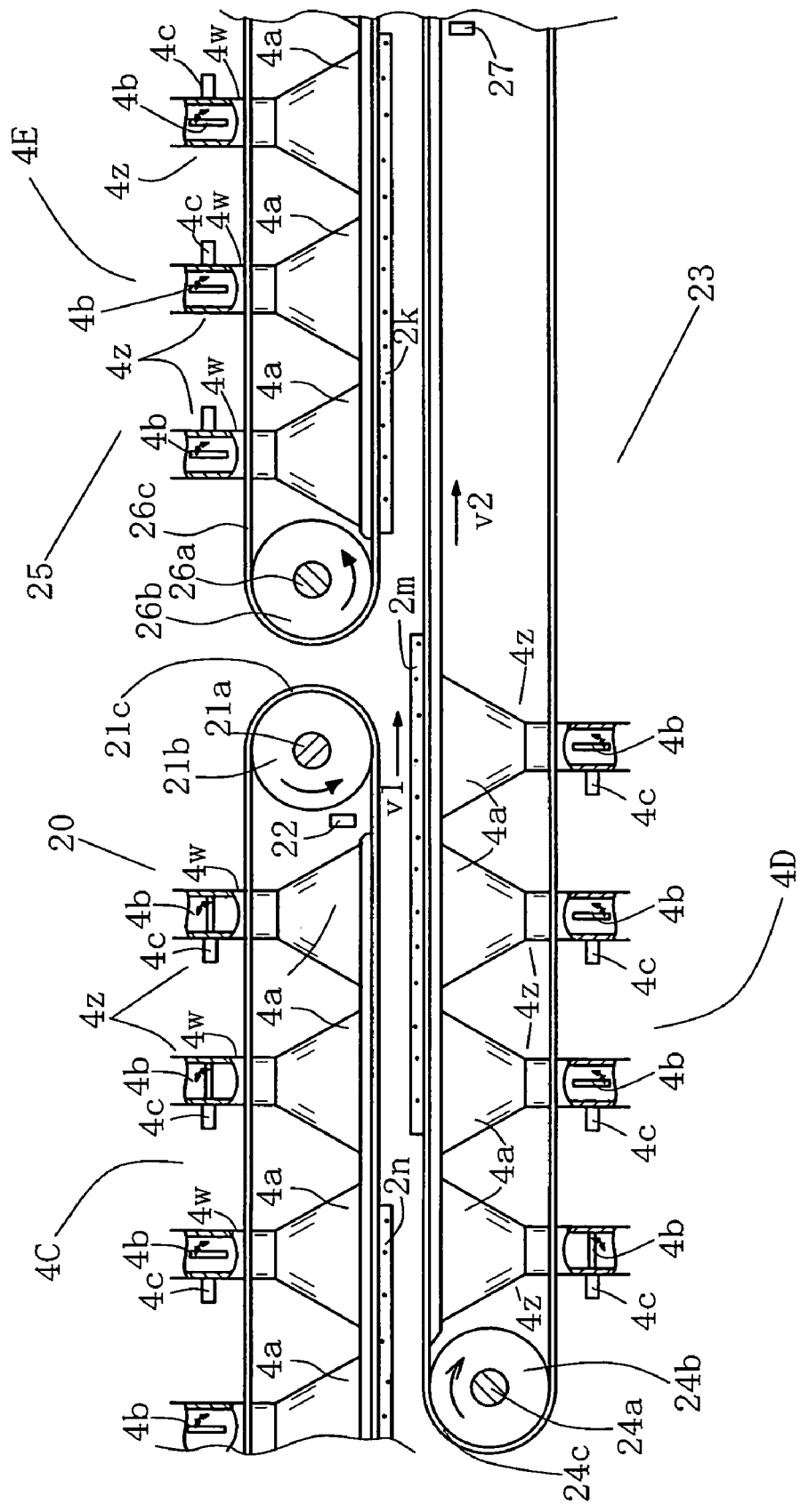
Figure 28:
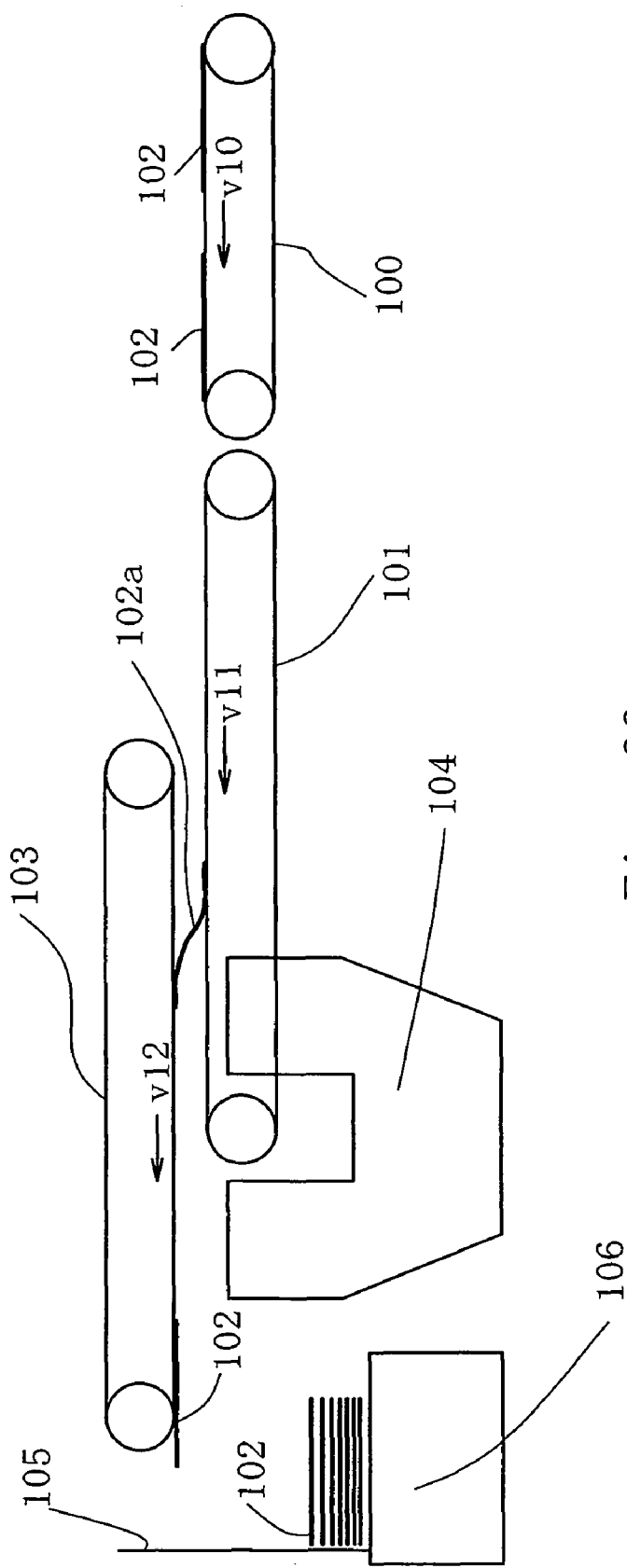
FIG. 28 is an illustrative view showing a veneer sheet conveying apparatus according to background art.

In the mean time, when the leading end of the veneer sheet 2k being moved by the second conveyer 23 is detected by the second sheet sensor 27, the control unit causes the air cylinders 4c of three suction members 4z (shown in FIG. 25) for the third conveyer 25 to be actuated so as to open their valves 4b simultaneously. As a result, the veneer sheet 2k is lifted and held by suction against the conveyer belts 26c of the third conveyer 25 and conveyed in arrow direction at the speed v2, as shown in FIG. 27. Similarly, the following veneer sheets 2m, 2n and so forth are conveyed at the speed v2 by the third conveyer 25 with a spacing formed between the trailing and leading ends of any two adjacent veneer sheets.

Though not shown in any of the drawings, a stacking station and veneer sheet releasing mechanism such as those which are used in the first embodiment may be provided at any suitable downstream region of the third conveyer 25 having three suction members such as those suction members 4z show, e.g., in FIG. 26. In such a case, veneer sheets conveyed by the third conveyer 25 are successively stacked onto a veneer sheet pile by deactivating suction at the suctions nozzles 4a of such suction members 4z and simultaneously activating the releasing mechanism in the same manner as in the first embodiment.

As a matter of course, the third conveyer 25 may be dispensed with and veneer sheets conveyed by the second conveyer 23 with a spacing between any two adjacent veneer sheets may be stacked at any stacking station provided adjacently to the downstream end of the second conveyer by using any know sheet stacker. For example, the sheet conveying apparatus may use a stacker having a pair of sheet supporting bars spaced away from each other in the direction perpendicular to the sheet conveying direction and adapted to receive thereon veneer sheets successively and then to release them by moving the bars away from each other thereby to allow a veneer sheet to be released and dropped onto a veneer sheet pile.

As is apparent from the foregoing, no damaging tension acts on a veneer sheet when it is transferred from the first conveyer 20 to the second conveyer 23 and also from the second conveyer 23 to the third conveyer 25.

It is to be understood that the present invention can be practiced in various changes and modifications as exemplified below without departing the spirit of the present invention.

In lifting a veneer sheet by suction of the suction members 4z from the first conveyer to the second conveyer in the first through fourth embodiments, the lifting may be assisted by air blown against the entire lower surface of the veneer sheet from below. For example, in the case of the first embodiment, a blower duct may be provided below the upper leg of the conveyer belts 1c of the first conveyer 1 so that air blowing acts over the entire width of a veneer sheet. Air blowing may be activated synchronously with the opening of the valves 4b of the suction members 4z for the S region of the second conveyer 3. The use of such blower helps to shorten the time for a veneer sheet to be transferred to the second conveyer.

The first sheet sensor 6 for detecting the arrival of a veneer sheet at a predetermined position in the S region, e.g. in the first embodiment, is located at a position adjacent to the downstream end of the first conveyer 1, although detection of the veneer sheet may be done at any suitable position upstream of the above end of the first conveyer 1. In such a case, determination of the arrival of a veneer sheet at a position where it is to be lifted for transferring may be accomplished by counting the moving distance of the belt conveyer 1c from the point of detection by using any suitable pulse counter.

In the first through fifth embodiments, the vertical spaced distance between two conveyer belts of any two conveyers disposed one above the other, for which a veneer sheet is moved by suction for transferring, may be set as desired depending on various factors such as capacity of the vacuum device, weight of a veneer sheet, etc.

What is claimed is:

1. A method for conveying a series of veneer sheets, comprising:
    conveying a veneer sheet having a leading end and a trailing end in a predetermined direction at a first speed by a first conveyer;
    detecting arrival of the veneer sheet at a predetermined position of the first conveyer;
    transferring by suction of a plurality of suction members arranged in said predetermined direction and activated simultaneously, the veneer sheet in the entirety of a dimension of the veneer sheet as measured in said predetermined direction from the first conveyer to a second conveyer disposed spaced vertically away from and parallel to the first conveyer when the veneer sheet has arrived at said predetermined position, and
    holding by suction of the plurality of suction members, the veneer sheet against the second conveyer, said second conveyer having a region overlapping with the first conveyer at least for a distance corresponding to said dimension of the veneer sheet, and said plurality of suction members being disposed at least in said overlapping region of the second conveyer and operable to develop suction substantially over said entirety of the dimension of the veneer sheet; conveying the veneer sheet in said predetermined direction at a second speed by the second conveyer and deactivating the suction of each suction member just after the trailing end of the veneer sheet has moved past said each suction member.

2. A method for conveying a series of veneer sheets, comprising:
    conveying a veneer sheet having a leading end and a trailing end in a predetermined direction at a first speed by a first conveyer; detecting arrival of the veneer sheet at a predetermined position of the first conveyer;
    transferring by suction of a plurality of suction members arranged in said predetermined direction and activated simultaneously, the veneer sheet in the entirety of a dimension of the veneer sheet as measured in said predetermined direction from the first conveyer to a second conveyer disposed spaced above and parallel to the first conveyer when the veneer sheet has arrived at said predetermined position, and holding by suction of the plurality of suction members, the veneer sheet against the second conveyer, said second conveyer having a region overlapping with the first conveyer at least for a distance corresponding to said dimension of the veneer sheet, and said plurality of suction members being disposed at least in said overlapping region of the second conveyer and operable to develop suction substantially over said entirety of the dimension of the veneer sheet and deactivating the suction of each suction member just after the trailing end of the veneer sheet has moved past said each suction member; conveying the sheet in said predetermined direction at a second speed by the second conveyer.

3. A method according to claim 1, wherein said second speed is faster than said first speed.

4. A method according to claim 3, further comprising releasing the veneer sheet from the second conveyer at a predetermined releasing position by a releasing mechanism and then stacking the veneer sheet onto a pile of veneer sheets, said releasing mechanism being operable to complete its releasing operation before a veneer sheet following the veneer sheet reaches said releasing position.

5. A method according to claim 1, wherein said second speed is substantially the same as said first speed.

6. A method according to claim 1, further comprising conveying a selected veneer sheet of said series of veneer sheets by the first conveyer without transferring to the second conveyer.

7. A method according to claim 6, wherein said conveying a selected veneer sheet is done for every other sheet.

8. An apparatus for successively conveying a series of veneer sheets, comprising:

a first conveyer for conveying a veneer sheet having a leading end and a trailing end in a predetermined direction at a first speed;

a second conveyer disposed spaced vertically away from and parallel to the first conveyer at a distance that is greater than the thickness of the veneer sheet for conveying the veneer sheet in said predetermined direction at a second speed, said second conveyer having a region overlapping with the first conveyer at least for a distance corresponding to a dimension of the veneer sheet as measured in said predetermined direction;

a plurality of suction members disposed at least in said overlapping region of the second conveyer for transferring by suction the veneer sheet in the entirety of said dimension from the first conveyer to the second conveyer and holding by suction the veneer sheet against the second conveyer, said plurality of suction members being operable to simultaneously develop suction substantially over said entirety of the dimension of the veneer sheet;

a veneer sheet sensor for detecting the arrival of a veneer sheet in said overlapping region and generating a detection signal indicative of said arrival; and a control unit operable in response to said detection signal to activate the plurality of suctions members simultaneously for the transferring of the veneer sheet and also to deactivate the suction of each suction member just after the trailing end of the veneer sheet has moved past said each suction member.

9. An apparatus according to claim 8, wherein the second conveyer is disposed spaced above the first conveyer.

10. An apparatus according to claim 9, wherein the second speed is faster than the first speed.

11. An apparatus according to claim 10, further comprising a stacker disposed downstream of said overlapping region of the second conveyer as viewed in said predetermined direction for stacking veneer sheets successively onto a pile of veneer sheets.

12. An apparatus according to claim 10, further comprising a roller for holding a veneer sheet being conveyed by the first conveyer against the first conveyer.

13. An apparatus according to claim 9, wherein said second speed is substantially the same as said first speed, and the first conveyer has an extension conveyer for conveying every other sheet in a direction other than said predetermined direction.

14. A method according to claim 2, wherein said second speed is faster than said first speed.

15. A method according to claim 14, further comprising releasing the sheet from the second conveyer at a predetermined releasing position by a releasing mechanism and then stacking the sheet onto a pile of sheets, said releasing mechanism being operable to complete its releasing operation before a sheet following the sheet reaches said releasing position.

16. A method according to claim 2, wherein said second speed is substantially the same as said first speed.

17. A method according to claim 2, further comprising conveying a selected sheet of said series of sheets by the first conveyer without transferring to the second conveyer.

18. A method according to claim 17, wherein said conveying a selected sheet is done for every other sheet.

19. A method of conveying a series of veneer sheets comprising the steps of:

(1) conveying a plurality of veneer sheets having substantially a same configuration in a predetermined direction with very little spacing between any two adjacent sheets by a first conveyor;

(2) arranging a plurality of suction members equidistantly in said predetermined direction along any one of said plurality of veneer sheets while said plurality of suction members are being deactivated, said plurality of suction members covering at least a distance substantially corresponding to a dimension of a selected one of said plurality of veneer sheets in said predetermined direction:

(3) activating said plurality of suction members simultaneously to simultaneously develop a suction force substantially on a selected one of said plurality of veneer sheets in its entirety at the time when said selected one of the veneer sheets arrive at a position corresponding to said plurality of suction members to lift said selected one of the veneer sheets such that such selected one of the veneer sheets are held by suction onto a second conveyor provided between said plurality of suction members and said first conveyor;

(4) and deactivating the suction of each suction member just after the trailing end of the veneer sheet as moved past said each suction member; and (5) repeating the steps (3) and (4) upon a subsequent veneer sheet succeeding said selected one of the plurality of veneer sheets arriving at said position corresponding to said plurality of suction members.

20. The method of conveying a series of veneer sheets according to claim 19, wherein said second conveyor travels faster than said first conveyor.

21. The method of conveying a series of veneer sheets according to claim 19, wherein said selected one of the plurality of veneer sheets is conveyed to a predetermined release position where said selected one of the plurality of veneer sheets is released from the second conveyor to be stacked onto a pile of veneer sheets, said releasing being completed before said subsequent veneer sheet reaches said releasing position.

22. The method of conveying a series of veneer sheets according to claim 19, wherein said second conveyor travels at a speed substantially the same as the first conveyor.

23. An apparatus for successively conveying a series of veneer sheets, comprising:
- a first conveyor for conveying a plurality of veneer sheets one by one, said plurality of veneer sheets having substantially a same configuration in a predetermined direction with very little spacing between any two adjacent sheets by a first conveyor;
- a plurality of suction members arranged equidistantly in said predetermined direction along said plurality of veneer sheets to cover at least a distance substantially corresponding to a dimension of a selected one of said plurality of veneer sheets in said predetermined direction, said plurality of suction members being activated simultaneously to simultaneously assert a suction force along an entirety of said selected one of the plurality of veneer sheets from said first conveyor;
- a second conveyor disposed above said first conveyor and below said plurality of suction members in such a position that said selected one of said plurality of veneer sheets on said first conveyor are sucked and pressed against said second conveyor said second conveyor being adapted to travel in the same direction as the first conveyor;
- a veneer sheet sensor for detecting a selected one of the plurality of veneer sheets arriving at a position corresponding to said plurality of suction members; and
- a control unit normally maintaining said plurality of suction members in a deactivated state but operable every time said veneer sheet sensor detects said selected one of the plurality of veneer sheets so as to activate said plurality of suction members simultaneously, said control unit further being operable to deactivate said plurality of suction members such that each time said selected one of said plurality of veneer sheets moves past each suction member from upstream to downstream.

24. The apparatus for successively conveying a series of veneer sheets according to claim 23, further including a roller means provided the most upstream one of said selected one of said plurality of the veneer sheets to hold said selected one of the veneer sheets against the first conveyor.

* * * * *